(12) United States Patent
Numata et al.

(10) Patent No.: US 11,892,722 B2
(45) Date of Patent: Feb. 6, 2024

(54) DISPLAY DEVICE

(71) Applicant: Japan Display Inc., Tokyo (JP)

(72) Inventors: Yudai Numata, Tokyo (JP); Kentaro Okuyama, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/180,275

(22) Filed: Mar. 8, 2023

(65) Prior Publication Data

US 2023/0221593 A1 Jul. 13, 2023

Related U.S. Application Data

(63) Continuation of application No. 17/495,236, filed on Oct. 6, 2021, now Pat. No. 11,624,948, which is a (Continued)

(30) Foreign Application Priority Data

Sep. 14, 2017 (JP) .................................. 2017-177073

(51) Int. Cl.
*G02F 1/1335* (2006.01)
*G02F 1/1333* (2006.01)
(Continued)

(52) U.S. Cl.
CPC .......... *G02F 1/1334* (2013.01); *G02F 1/1343* (2013.01); *G02F 1/133504* (2013.01); *G02F 1/133512* (2013.01); *G02F 1/133553* (2013.01); *G02F 1/133615* (2013.01); *G02F 1/133616* (2021.01); *G02F 2201/121* (2013.01); *G02F 2201/123* (2013.01)

(58) Field of Classification Search
CPC .... G02F 1/1333; G02F 1/1334; G02F 1/1335; G02F 1/133504; G02F 1/133512; G02F 1/133524; G02F 1/133553; G02F 1/1336; G02F 1/133615; G02F 1/133616; G02F 1/1343; G02F 2201/121; G02F 2201/123
See application file for complete search history.

(56) References Cited

U.S. PATENT DOCUMENTS 6,229,585 B1    5/2001    Yanagi
6,474,824 B1   11/2002    Wada
(Continued)

FOREIGN PATENT DOCUMENTS

JP      H10123514 A    5/1998
JP      H11119206 A    4/1999
(Continued)

OTHER PUBLICATIONS

Japanese Office Action dated Jun. 8, 2021, in Japanese Patent Application No. 2017-177073, (submitting English translation only), 5 pages.

*Primary Examiner* — Thoi V Duong
(74) *Attorney, Agent, or Firm* — Maier & Maier, PLLC

(57) ABSTRACT

According to one embodiment, a display device includes a first substrate, a second substrate including a first end portion and a second end portion located at a position different from the first end portion, a polymer dispersed liquid crystal layer disposed between the first substrate and the second substrate, a light source device located above the first substrate and disposed along the first end portion, and a light-shielding member disposed on at least a part of the second end portion.

8 Claims, 19 Drawing Sheets

Related U.S. Application Data continuation of application No. 16/903,784, filed on Jun. 17, 2020, now Pat. No. 11,187,932, which is a continuation of application No. 16/130,256, filed on Sep. 13, 2018, now Pat. No. 10,725,327.

(51) Int. Cl.
*G02F 1/1334* (2006.01)
*G02F 1/1343* (2006.01)
*G02F 1/13357* (2006.01)

(56) References Cited

U.S. PATENT DOCUMENTS

| | | |
|---|---|---|
| 10,725,327 B2 | 7/2020 | Numata et al. |
| 2002/0180908 A1 | 12/2002 | Ariyoshi et al. |
| 2006/0014085 A1 | 1/2006 | Nakajima et al. |
| 2010/0085510 A1 | 4/2010 | Okuyama et al. |
| 2011/0037924 A1 | 2/2011 | Kido |
| 2011/0109663 A1 | 5/2011 | Uchida et al. |
| 2012/0098875 A1 | 4/2012 | Shinkai et al. |
| 2012/0281273 A1 | 11/2012 | Shinkai et al. |
| 2013/0257880 A1 | 10/2013 | Li et al. |
| 2014/0055835 A1 | 2/2014 | Shinkai et al. |
| 2014/0240642 A1 | 8/2014 | Furukawa et al. |
| 2015/0293402 A1 | 10/2015 | Shinkai et al. |
| 2016/0070047 A1 | 3/2016 | Okuyama et al. |
| 2017/0160592 A1 | 6/2017 | Okuyama |
| 2017/0269433 A1 | 9/2017 | Sugiyama et al. |
| 2017/0285420 A1 | 10/2017 | Okuyama et al. |
| 2018/0031758 A1 | 2/2018 | Mizuno et al. |
| 2019/0137680 A1 | 5/2019 | Kuge et al. |

FOREIGN PATENT DOCUMENTS

| | | |
|---|---|---|
| JP | 201092682 A | 4/2010 |
| JP | 5467389 B2 | 4/2014 |
| JP | 201657338 A | 4/2016 |

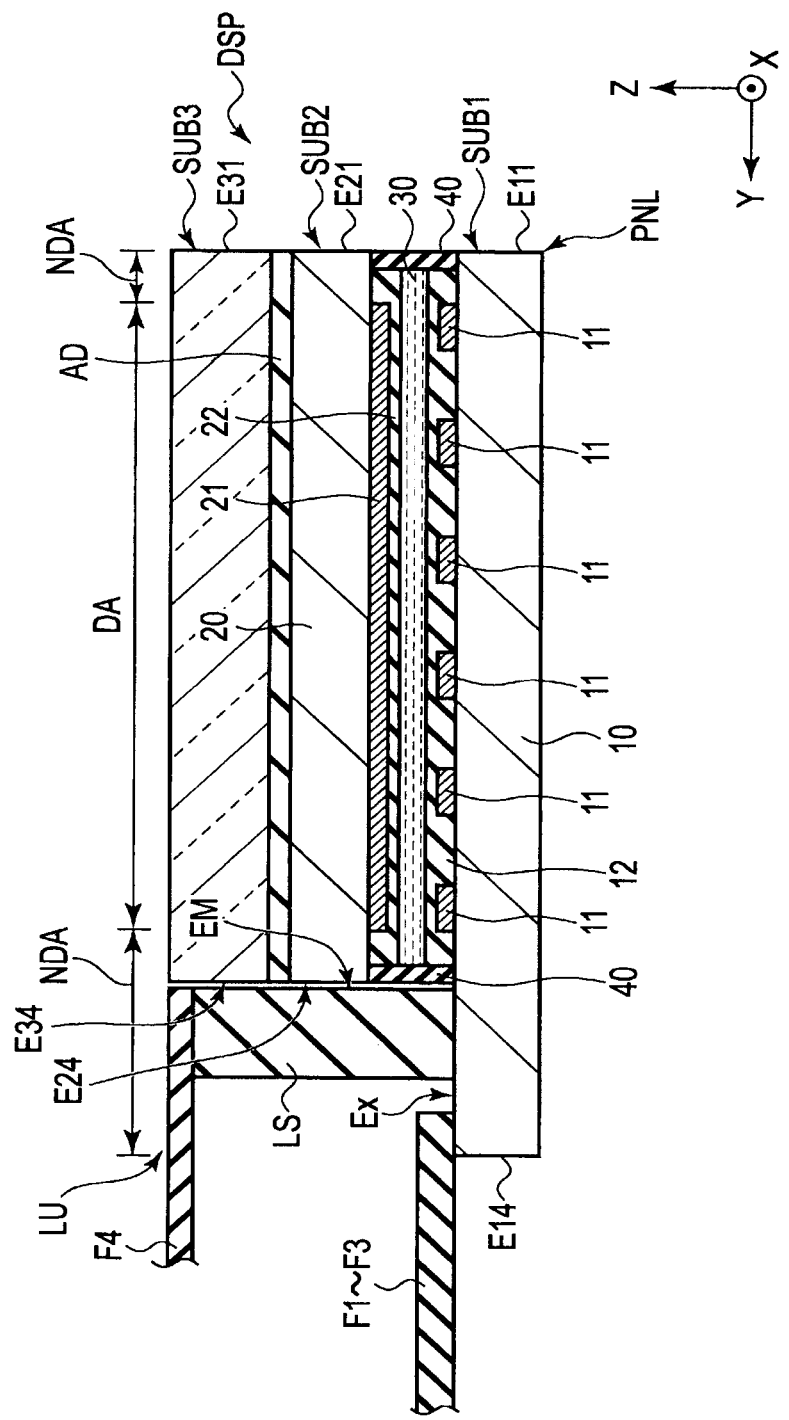
F I G. 3

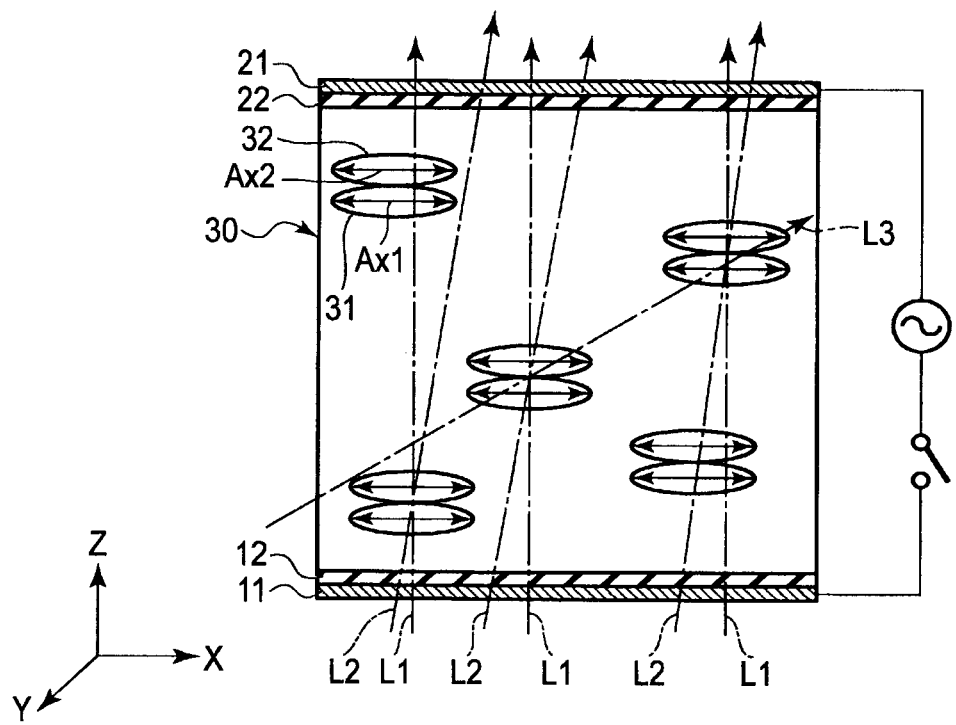
F I G. 4
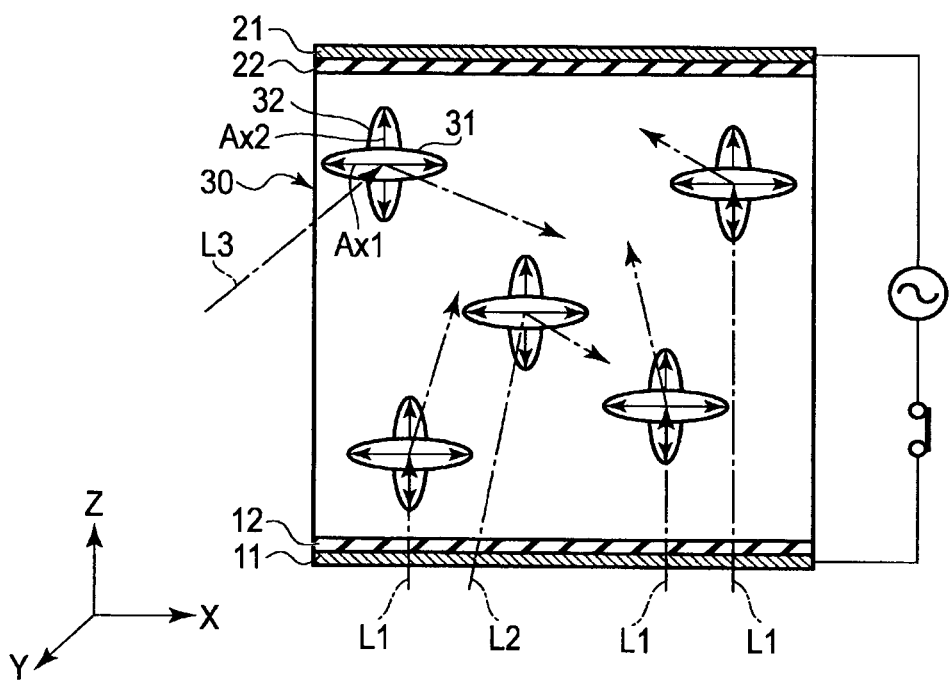
F I G. 5

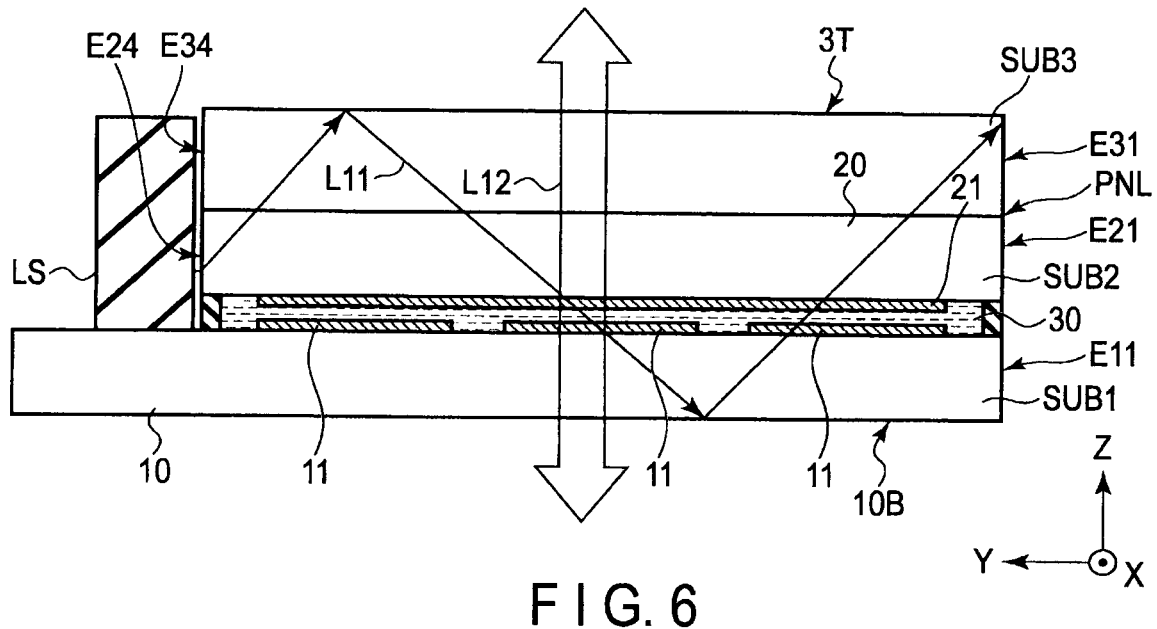
F I G. 6
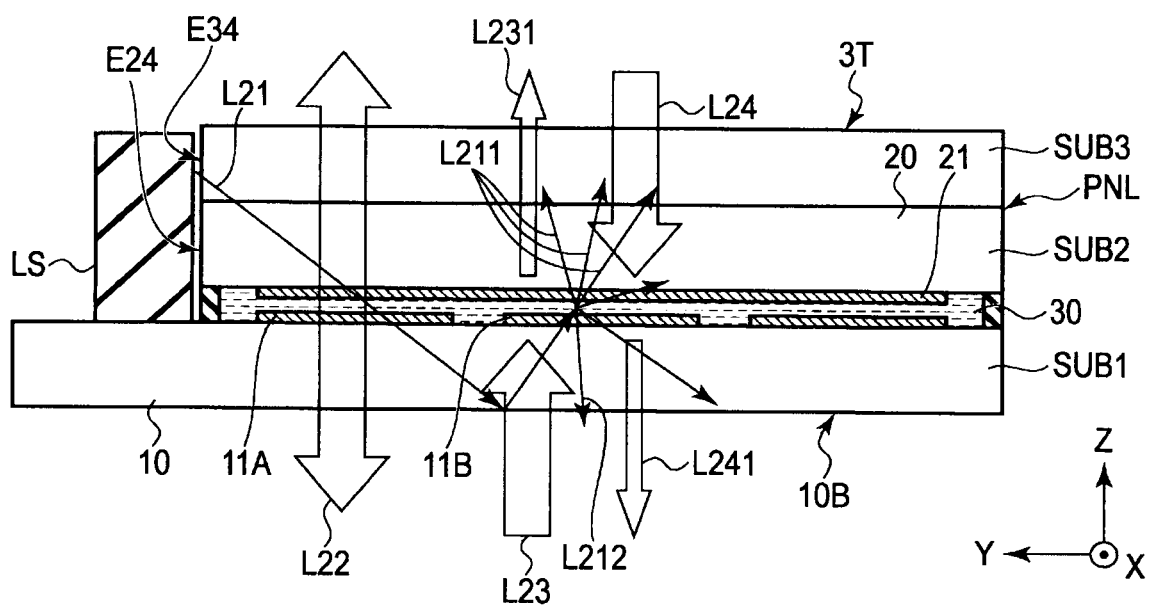
F I G. 7

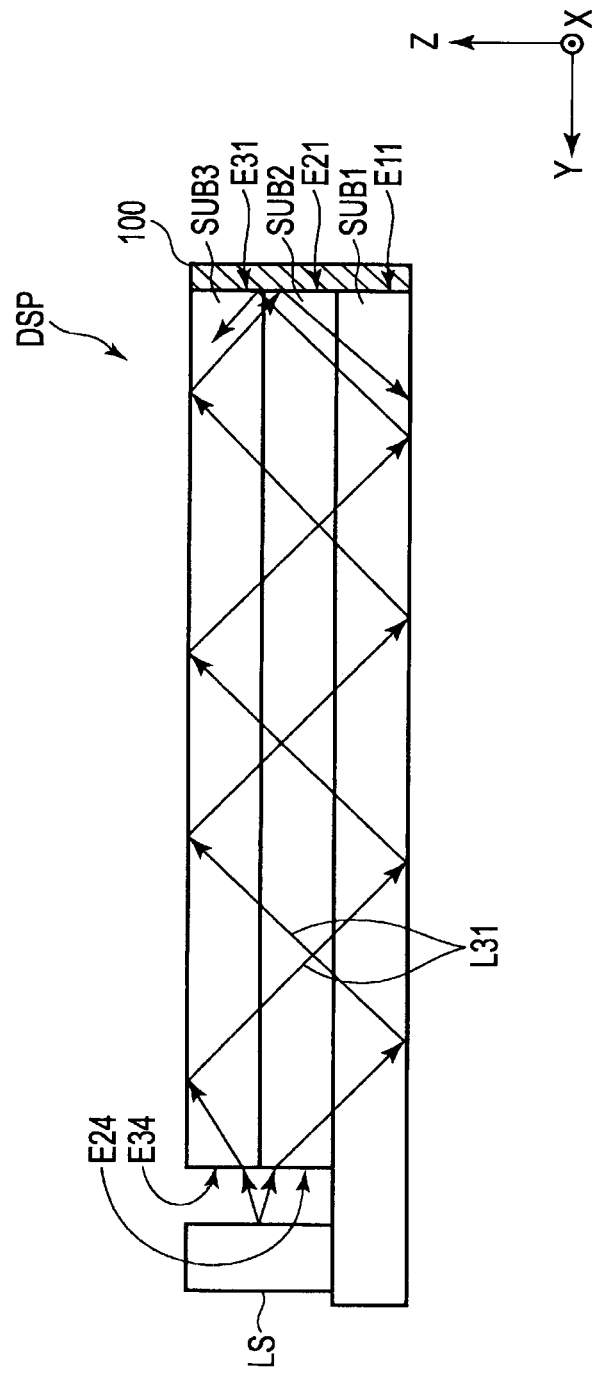
F I G. 10

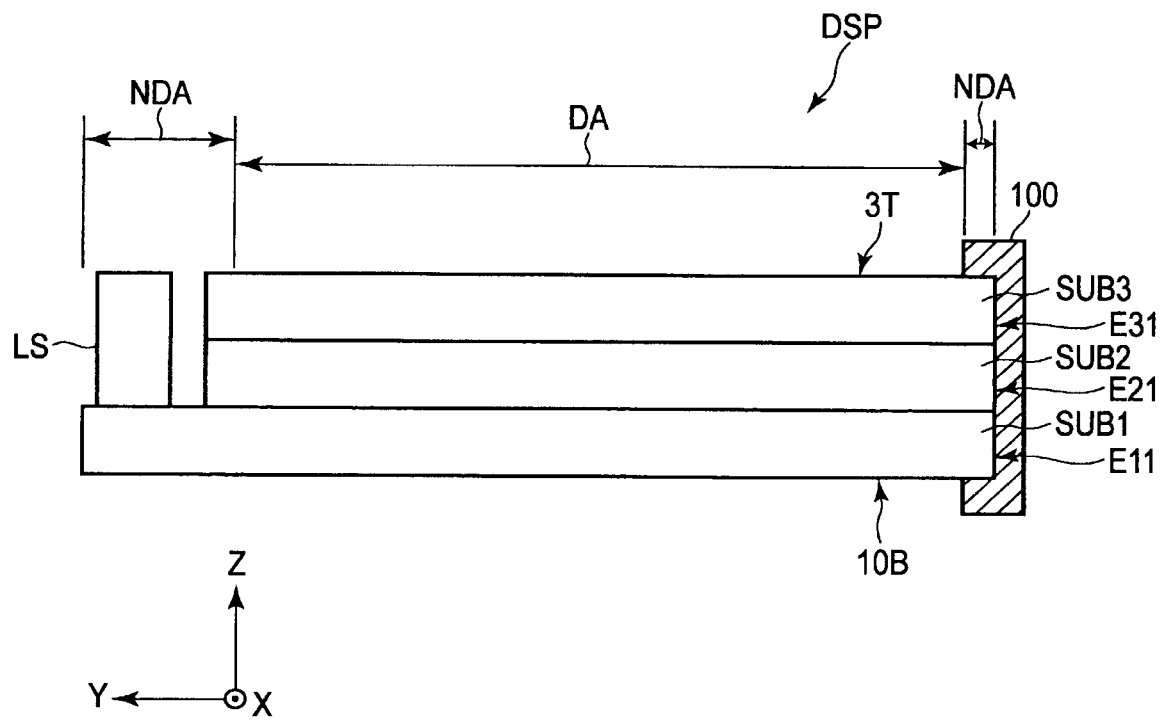
F I G. 11
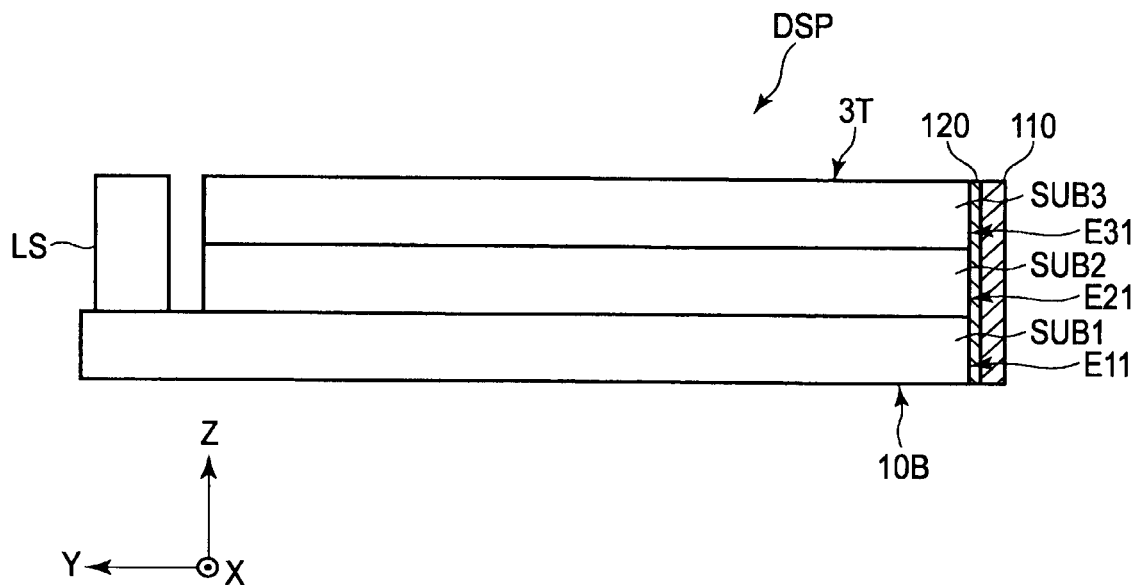
F I G. 13

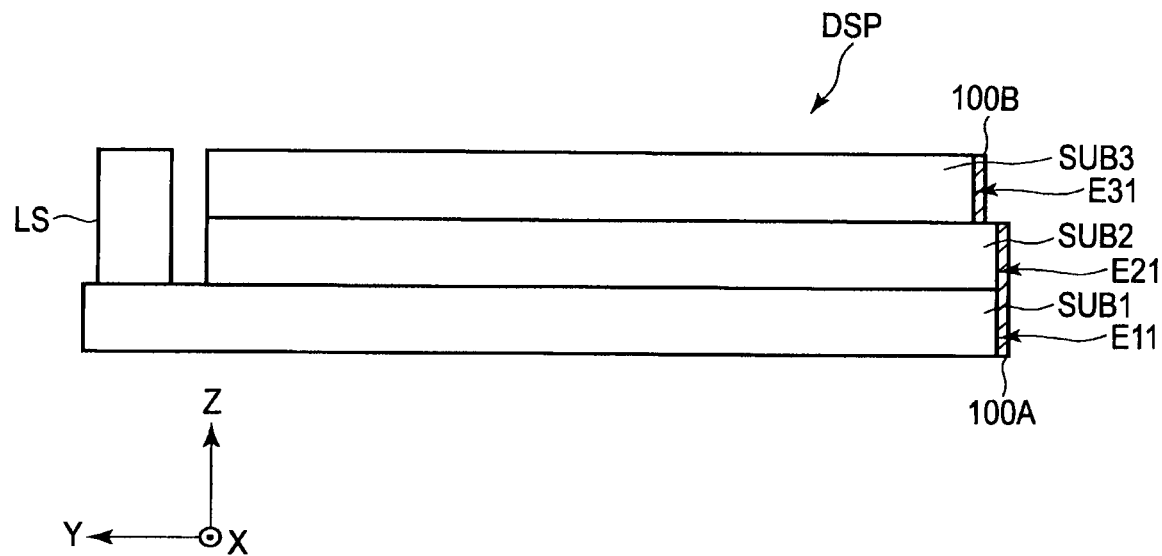
F I G. 12A
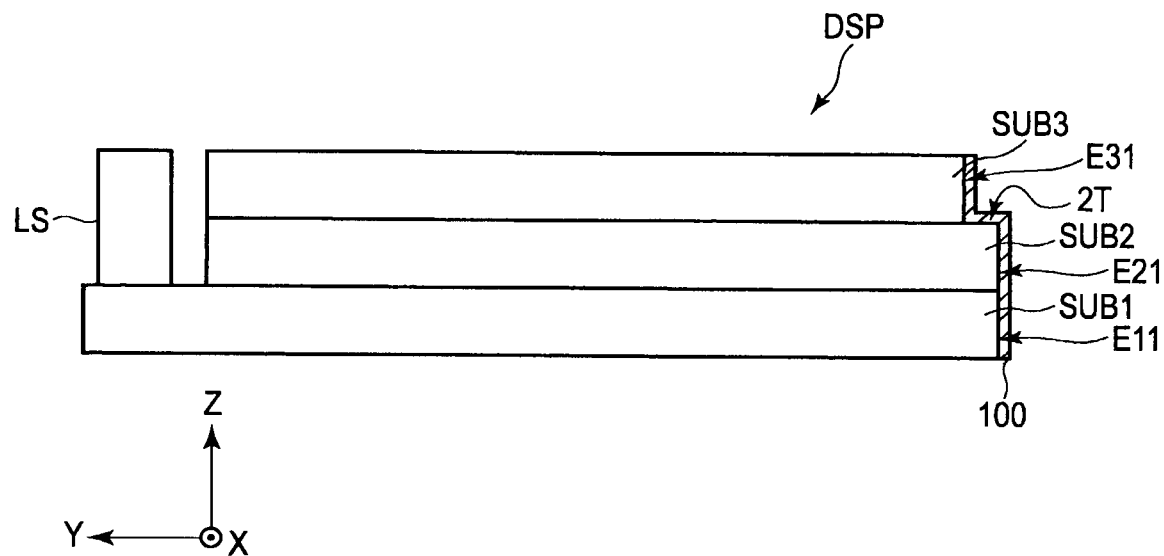
F I G. 12B

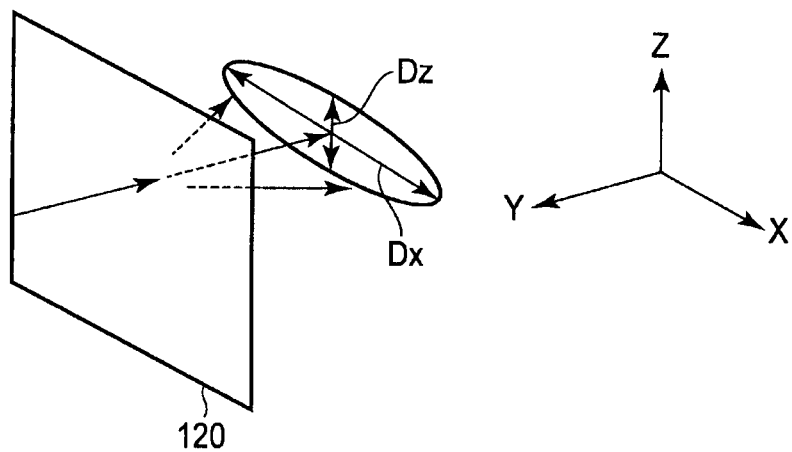
F I G. 14
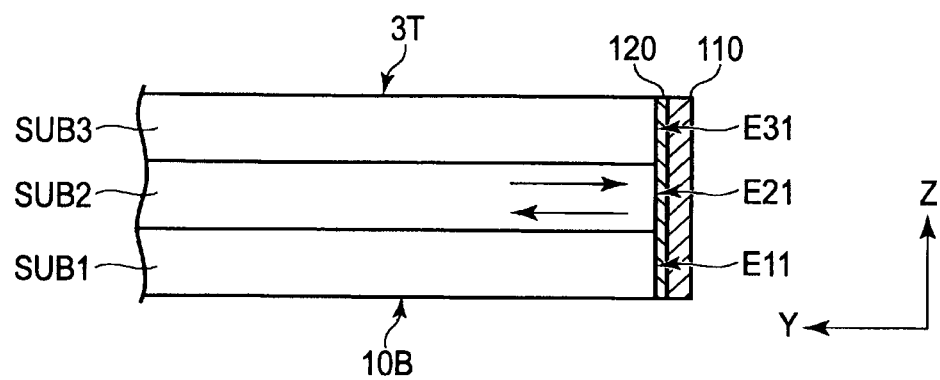
F I G. 15
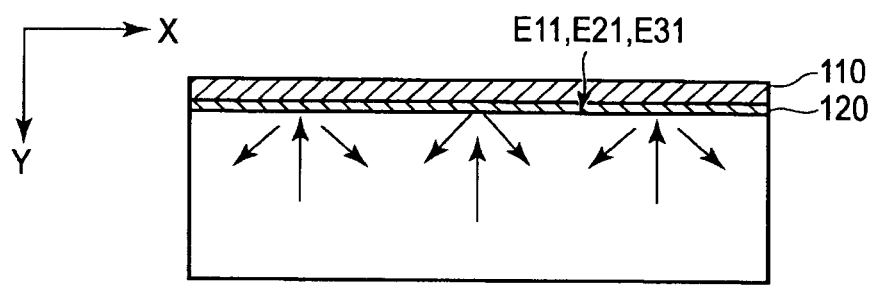
F I G. 16

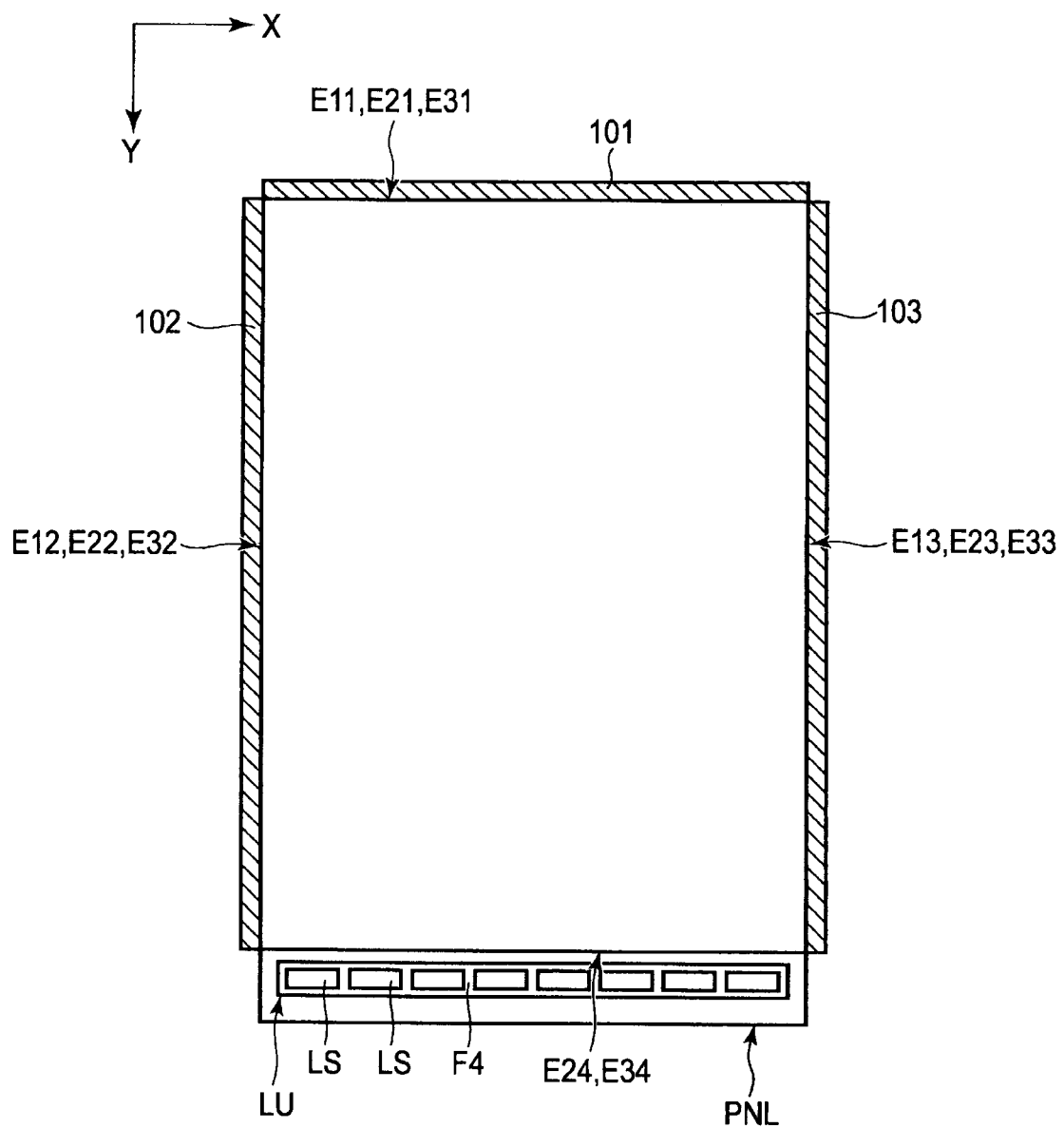
F I G. 18

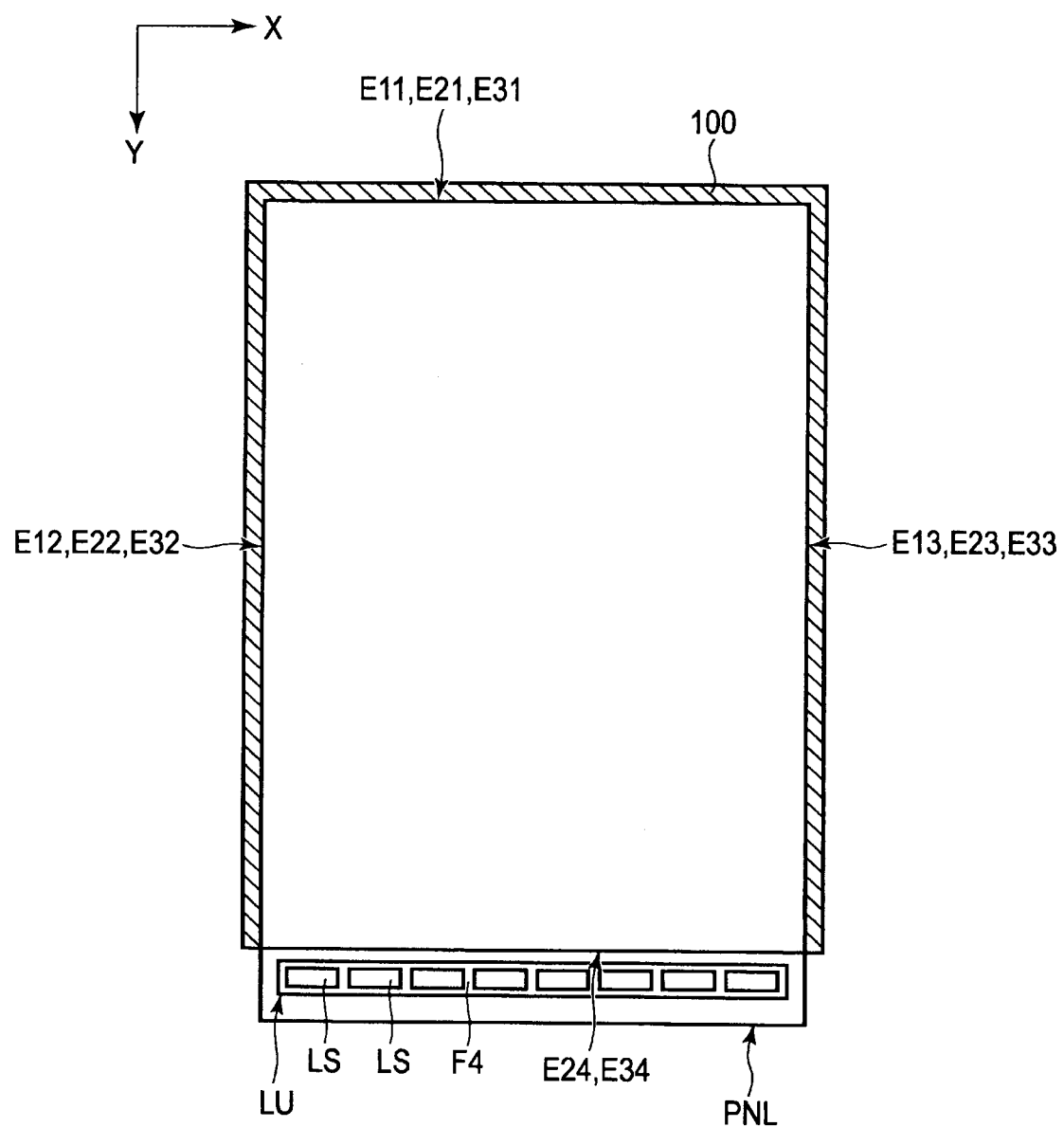
F I G. 19

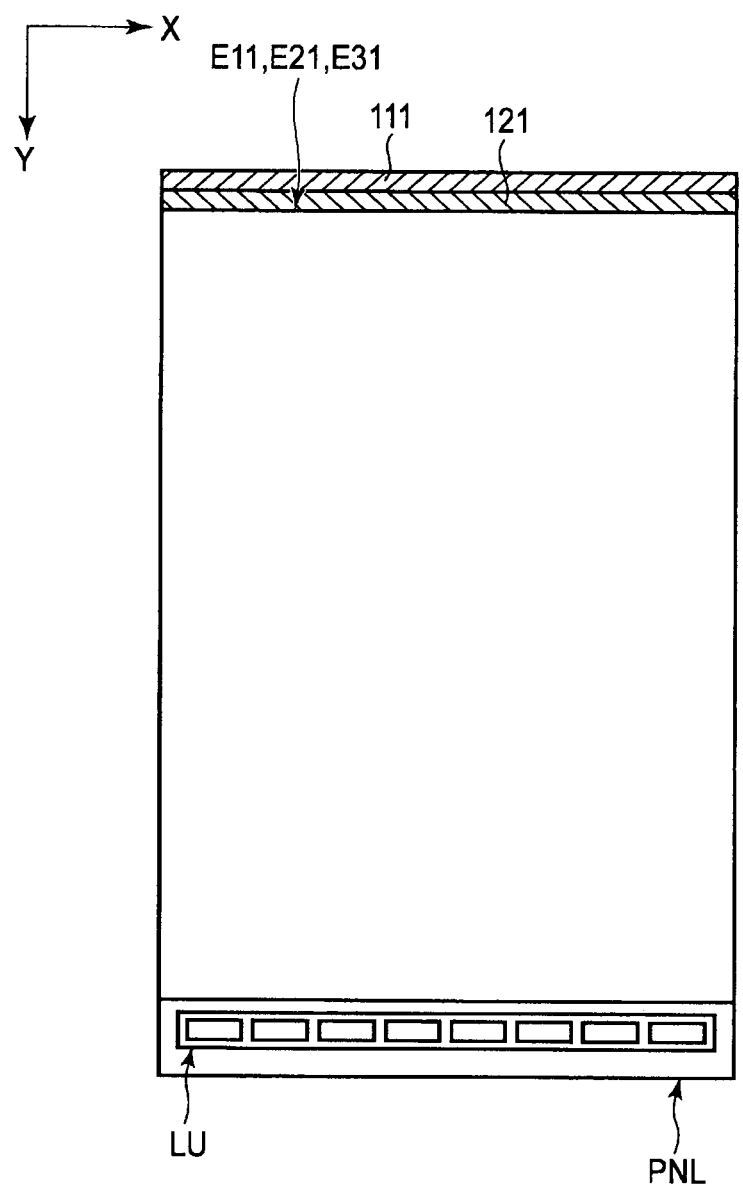
F I G. 20

DISPLAY DEVICE

CROSS-REFERENCE TO RELATED APPLICATIONS

This application is a continuation of U.S. patent application Ser. No. 17/495,236, filed on Oct. 6, 2021, which is a continuation of U.S. patent application Ser. No. 16/903,784, filed on Jun. 17, 2020, now U.S. Pat. No. 11,187,932, issued on Nov. 30, 2021, which is a continuation of U.S. patent application Ser. No. 16/130,256, filed on Sep. 13, 2018, now U.S. Pat. No. 10,725,327, issued on Jul. 28, 2020, which is based upon and claims the benefit of priority from Japanese Patent Application No. 2017-177073, filed on Sep. 14, 2017, the entire contents of each of which are incorporated herein by reference.

FIELD

Embodiments described herein relate generally to a display device.

BACKGROUND

Recently, various types of illumination devices employing polymer dispersed liquid crystal (hereinafter called "PDLC") capable of switching a diffusing state of diffusing incident light and a transmitting state of transmitting incident light have been proposed. A light guide propagates light from a light source. On the light guide, the propagated light may leak at an end portion on a side opposite to a light incident surface.

In contrast, various display devices employing PDLC have been reviewed in recent years.

BRIEF DESCRIPTION OF THE DRAWINGS

FIG. 3 is a cross-sectional view showing the display device DSP shown in FIG. 1.

FIG. 4 is an illustration schematically showing liquid crystal layer 30 in a transparent state.

FIG. 5 is an illustration schematically showing the liquid crystal layer 30 in a scattering state.

FIG. 6 is a cross-sectional view showing the display panel PNL in a case where the liquid crystal layer 30 is in a transparent state.

FIG. 7 is a cross-sectional view showing the display panel PNL in a case where the liquid crystal layer 30 is in a scattering state.

FIG. 10 is a cross-sectional view for explanation of an action in a case where the functional member 100 is a reflective member.

FIG. 11 is a cross-sectional view showing a second configuration example.

FIG. 12A is a cross-sectional view showing a third configuration example.

FIG. 12B is a cross-sectional view showing a modified example of the third configuration example.

FIG. 13 is a cross-sectional view showing a fourth configuration example.

FIG. 14 is an illustration for explanation of diffusibility of a second functional member 120 which is a diffusing member.

FIG. 15 is a cross-sectional view for explanation of an action of the second functional member 120 shown in FIG. 14.

FIG. 16 is a plan view for explanation of an action of the second functional member 120 shown in FIG. 14.

FIG. 18 is a plan view showing a second arrangement example.

FIG. 19 is a plan view showing a third arrangement example.

FIG. 20 is a plan view showing a fourth arrangement example.

DETAILED DESCRIPTION

In general, according to one embodiment, there is provided a display device comprising: a first substrate; a second substrate including a first end portion and a second end portion located at a position different from the first end portion; a polymer dispersed liquid crystal layer disposed between the first substrate and the second substrate; a light source device located above the first substrate and disposed along the first end portion; and a light-shielding member disposed on at least a part of the second end portion.

According to another embodiment, there is provided a display device comprising: a first substrate; a second substrate including a first end portion and a second end portion located at a position different from the first end portion; a polymer dispersed liquid crystal layer disposed between the first substrate and the second substrate; a light source device located above the first substrate and disposed along the first end portion; and a reflective member disposed on at least a part of the second end portion.

Embodiments will be described hereinafter with reference to the accompanying drawings. The disclosure is a mere example, and arbitrary change of gist which can be easily conceived by a person of ordinary skill in the art naturally falls within the inventive scope. To more clarify the explanations, the drawings may pictorially show width, thickness, shape and the like of each portion as compared with actual embodiments, but they are mere examples and do not restrict the interpretation of the invention. Furthermore, in the description and figures of the present application, structural elements having the same or similar functions will be referred to by the same reference numbers and detailed explanations of them that are considered redundant may be omitted.

Figure 1:
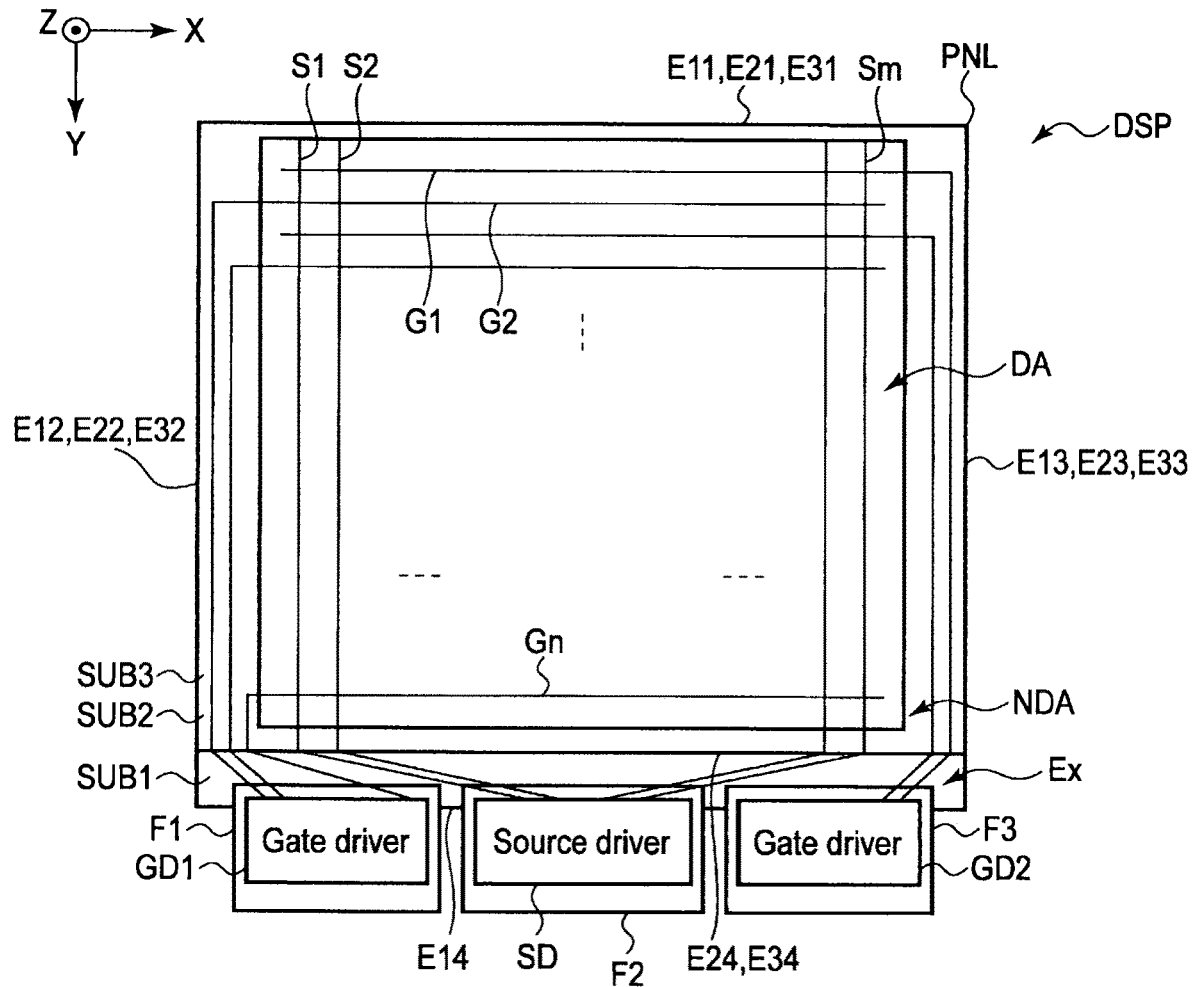
FIG. 1 is a plan view showing a configuration example of a display device DSP according to the embodiments.

FIG. 1 is a plan view showing a configuration example of a display device DSP according to the embodiments. In the drawing, a first direction X and a second direction Y intersect each other, and a third direction Z intersects the first direction X and the second direction Y. For example, the first direction X, the second direction Y, and the third direction Z are orthogonal to each other but may intersect at an angle other than ninety degrees. In the present specification, a position of a distal side of arrow indicating the third direction Z is called an upper position while a position of a back side of the arrow is called a lower position. According to "a second member above a first member" and "a second member below a first member", the second member may be in contact with the first member or may be remote from the first member. In addition, an observation position at which the display device DSP is observed is assumed to be located on the distal side of the arrow indicating the third direction Z, and viewing from the observation position toward the X-Y plane defined by the first direction X and the second direction Y is called a planar view.

In the embodiments, a display device employing polymer dispersed liquid crystal will be explained as an example of the display device. The display device DSP comprises a display panel PNL and wiring substrates F1 to F3. In addition, the display device DSP also comprises a light source device (not shown).

The display panel PNL comprises a first substrate SUB1, a second substrate SUB2, and a third substrate SUB3. The first substrate SUB1, the second substrate SUB2, and the third substrate SUB3 are arranged in this order in the third direction Z and overlap in planar view. The display panel PNL includes a display area DA on which an image is displayed and a frame-shaped non-display area NDA surrounding the display area DA. The display area DA is located in an area where the first substrate SUB1 and the second substrate SUB2 overlap. The display panel PNL includes n scanning lines G (G1 to Gn) and m signal lines S (S1 to Sm), in the display area DA. Each of n and m is a positive integer, and n may be equal to or different from m. The scanning lines G extend in the first direction X and are arranged at intervals in the second direction Y. The signal lines S extend in the second direction Y and are arranged at intervals in the first direction X.

The first substrate SUB1 includes end portions E11 and E14 extending in the first direction X, and end portions E12 and E13 extending in the second direction Y. The second substrate SUB2 includes end portions E21 and E24 extending in the first direction X, and end portions E22 and E23 extending in the second direction Y. The third substrate SUB3 includes end portions E31 and E34 extending in the first direction X, and end portions E32 and E33 extending in the second direction Y.

In the example illustrated in FIG. 1, the end portions E11, E21, and E31 overlap but at least one of three end portions may be displaced, in planar view. Similarly, the end portions E12, E22, and E32 overlap but may be displaced from one another. Similarly, the end portions E13, E23, and E33 overlap but may be displaced from one another. The end portions E24 and E34 are located between the end portion E14 and the display area DA in planar view. The first substrate SUB1 includes an extension portion Ex between the end portions E14 and E24.

The wiring substrates F1 to F3 are connected to the extension portion Ex and arranged in this order in the first direction X. The wiring substrate F1 is provided with a gate driver GD1. The wiring substrate F2 is provided with a source driver SD. The wiring substrate F3 is provided with a gate driver GD2. The wiring substrates F1 to F3 may be replaced with a single wiring substrate.

The signal lines S are drawn to the non-display area NDA and connected to the source driver SD. The scanning lines G are drawn to the non-display area NDA and connected to the gate drivers GD1 and/or GD2. In the example illustrated in FIG. 1, odd-numbered scanning lines G are drawn between the end portion E13 and the display area DA and connected to the gate driver GD2. In addition, even-numbered scanning lines G are drawn between the end portion E12 and the display area DA and connected to the gate driver GD1. The relationship in connection between the gate drivers GD1 and GD2 and the scanning lines G is not limited to the example illustrated.

Figure 2:
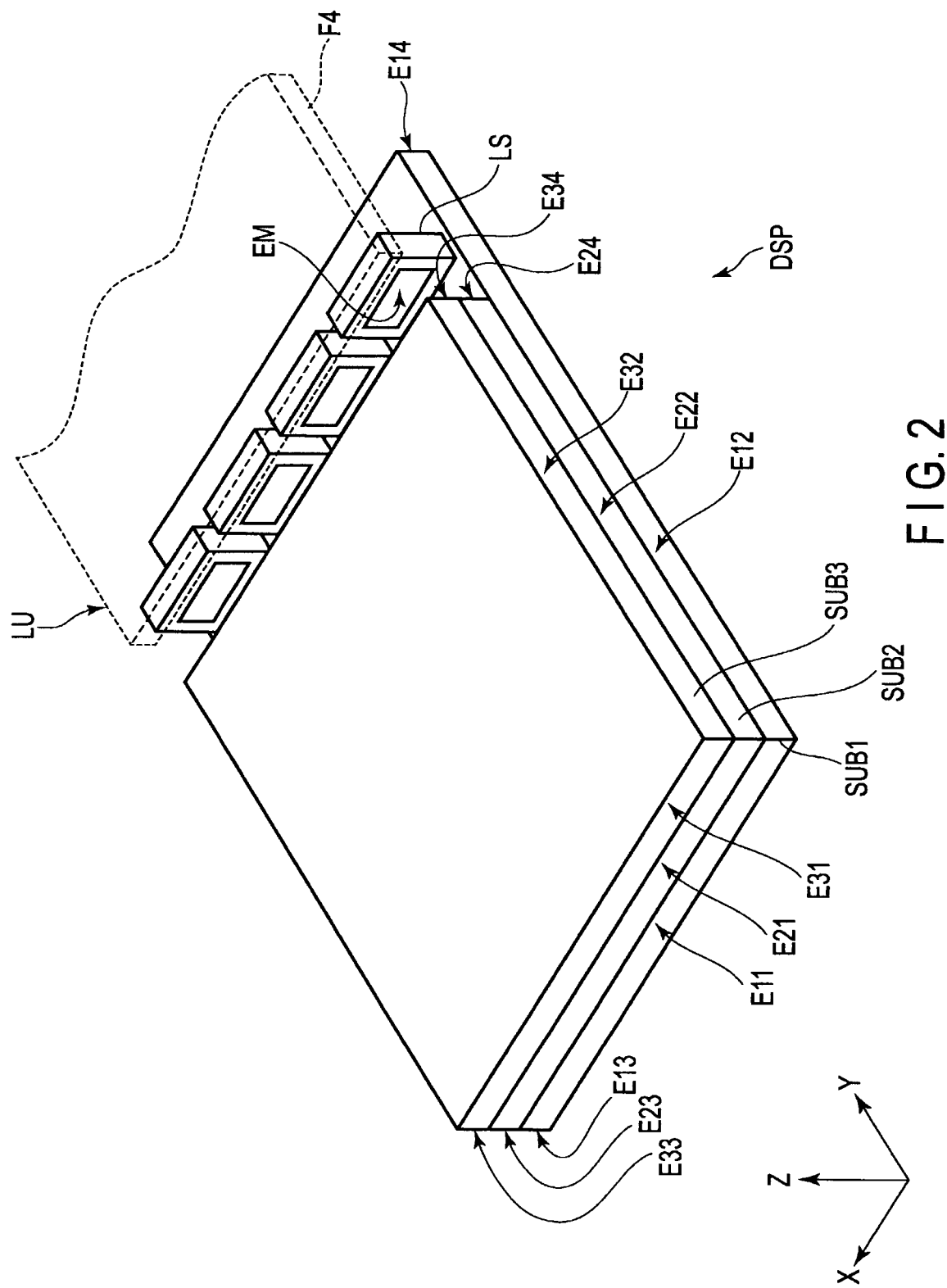
FIG. 2 is a perspective view showing the display device DSP shown in FIG. 1.

FIG. 2 is a perspective view showing the display device DSP shown in FIG. 1. Illustration of the wiring substrates F1 to F3 is omitted. A light source device LU is located above the first substrate SUB1 and disposed along the end portions E24 and E34. The light source device LU comprises light-emitting elements LS and a wiring substrate F4 represented by a dotted line. The light-emitting elements LS are arranged at intervals in the first direction X. Each of the light-emitting elements LS is connected to the wiring substrate F4. The light-emitting elements LS are located between the first substrate SUB1 and the wiring substrate F4 in the third direction Z. The light-emitting elements LS are, for example, light-emitting diodes. Each of the light-emitting elements LS comprises a light-emitting portion EM. The light-emitting portion EM faces the end portions E24 and E34. The light-emitting portion EM may be in contact with the end portions E24 and E34. In addition, an air layer, an optical element, and the like may be interposed between the light-emitting portion EM and the end portions E24 and E34. The end portions E24 and E34 correspond to incidence portions in which the light emitted from the light-emitting portion EM is made incident.

In the present specification, an end portion for incidence at which the light source device LU is disposed, of the end portions E21 to E24 of the second substrate SUB2, corresponds to a first end portion, and the other end portion at a position different from the first end portion corresponds to a second end portion. An end portion located on the second end portion side, of the end portions E11 to E14 of the first substrate SUB1, corresponds to a third end portion. An end portion located on the first end portion side, of the end portions E31 to E34 of the third substrate SUB3, corresponds to the fourth end portion, and an end portion located on the second end portion side, of the end portions E31 to E34, corresponds to a fifth end portion.

For example, the end portion E24 corresponds to the first end portion, the end portions E21 to E23 correspond to the second end portions, the end portions E11 to E13 correspond to the third end portions, the end portion E34 corresponds to the fourth end portion, and the end portions E31 to E33 correspond to the fifth end portions.

The second, third, and fifth end portions may include an end portion curved in planar view. In contrast, if the second end portions include linearly extending end portions E21 to E23, the end portion E21 opposed to the first end portion is considered as a first portion, and the end portions E22 and E23 which are adjacent to the first end portion and the first portion and which are opposed to each other are considered as a second portion and a third portion, respectively.

The end portions in the present specification correspond to the side surfaces or end surfaces having widths in the third direction Z, in each of the first substrate SUB1, the second substrate SUB2, and the third substrate SUB3.

FIG. 3 is a cross-sectional view showing the display device DSP shown in FIG. 1. Main portions alone in the cross-section of the display device DSP in a Y-Z plane defined by the second direction Y and the third direction Z will be explained here. The display panel PNL comprises a liquid crystal layer 30 held between the first substrate SUB1 and the second substrate SUB2. The first substrate SUB1 and the second substrate SUB2 are bonded to each other by a seal 40. The third substrate SUB3 is bonded to the second substrate SUB2 by a transparent adhesive AD disposed across the display area DA and the non-display area NDA.

The first substrate SUB1 comprises a transparent substrate 10, a pixel electrode 11, an alignment film 12, and the like. The second substrate SUB2 comprises a transparent substrate 20, a common electrode 21, an alignment film 22, and the like. The third substrate SUB3 is a transparent substrate. The transparent substrates 10 and 20 and the third substrate SUB3 are insulating substrates such as glass substrates or plastic substrates. The pixel electrodes 11 and the common electrode 21 are formed of, for example, a transparent conductive material such as indium tin oxide (ITO) or indium zinc oxide (IZO). The alignment films 12 and 22 may be horizontal alignment films having an alignment restriction force approximately parallel to the X-Y plane or may be vertical alignment films having an alignment restriction force approximately parallel to the third direction Z. The liquid crystal layer 30 is located in at least the display area DA. The liquid crystal layer 30 is located between the alignment films 12 and 22. The transparent state and the scattering state in the liquid crystal layer 30 are controlled in response to voltages of the pixel electrodes 11 and the common electrode 21, as explained with reference to FIG. 4 and FIG. 5.

The light-emitting element LS is located above the extension portion Ex. In addition, the light-emitting element LS is located between the wiring substrate F1 to F3 and the second substrate SUB2 in the second direction Y. The light-emitting element LS emits light from the light-emitting portion EM toward the end portions E24 and E34. The light incident on the display panel PNL from the end portions E24 and E34 propagates in a direction opposite to the arrow representing the second direction Y as explained below. The light-emitting element LS may be opposed to the end portions of the first substrate SUB1, the second substrate SUB2, and the third substrate SUB3, for example, the end portions E11, E21, and E31.

The end portion E11 includes the side surface of the transparent substrate 10. The end portion E21 includes a part of the side surface of the transparent substrate 20. The end portion E31 includes a part of the side surface of the third substrate SUB3.

FIG. 4 is an illustration schematically showing liquid crystal layer 30 in a transparent state. The example illustrated in FIG. 4 corresponds to a state in which no voltage is applied to the liquid crystal layer 30 (for example, a state in which a potential difference between the pixel electrode 11 and the common electrode 21 is approximately zero).

The liquid crystal layer 30 is a polymer dispersed liquid crystal layer including polymer 31 which is a polymeric compound and liquid crystal molecules 32. For example, the polymer 31 is liquid crystal polymer. The polymer 31 can be obtained by, for example, polymerizing liquid crystal monomer in a state of being aligned in a predetermined direction by the alignment restriction force of the alignment films 12 and 22. For example, the alignment treatment direction of the alignment films 12 and 22 agrees with the first direction X, and the alignment films 12 and 22 have the alignment restriction force in the first direction X. For this reason, the polymer 31 is formed in a streaky shape or a stripe shape extending in the first direction X. The liquid crystal molecules 32 are dispersed in gaps of the polymer 31 and aligned such that their major axis extends in the first direction X.

The polymer 31 and the liquid crystal molecule 32 have optical anisotropy or refractive anisotropy. The liquid crystal molecule 32 may be positive liquid crystal molecule having a positive dielectric anisotropy or negative liquid crystal molecule having a negative dielectric anisotropy. The polymer 31 and the liquid crystal molecule 32 are different in response performance to the electric field. The response performance of the polymer 31 to the electric field is lower than the response performance of the liquid crystal molecule 32 to the electric field.

An optical axis Ax1 of the polymer 31 and an optical axis Ax2 of the liquid crystal molecule 32 are parallel to each other. In the example illustrated in FIG. 4, each of the optical axis Ax1 and the optical axis Ax2 is parallel to the first direction X. The polymer 31 and the liquid crystal molecule 32 have approximately equivalent refractive anisotropy. In other words, ordinary refractive indexes of the polymer 31 and the liquid crystal molecule 32 are approximately equivalent to each other, and extraordinary refractive indexes of the polymer 31 and the liquid crystal molecule 32 are approximately equivalent to each other. For this reason, refractive index difference is hardly present between the polymer 31 and the liquid crystal molecule 32 in all directions including the first direction X, the second direction Y, and the third direction Z. For this reason, a light beam L1 incident on the liquid crystal layer 30 in the third direction Z is transmitted while hardly scattered in the liquid crystal layer 30. A light beam L2 incident in a direction oblique with respect to the third direction Z is hardly scattered in the liquid crystal layer 30, either. For this reason, high transparency can be obtained. The state illustrated in FIG. 4 is called a transparent state. For example, the light beam L3 corresponds to the light emitted from the light-emitting element LS shown in FIG. 3, and propagates in a direction opposite to the direction represented by an arrow of the second direction Y while hardly scattered in the liquid crystal layer 30.

FIG. 5 is an illustration schematically showing the liquid crystal layer 30 in a scattering state. The example illustrated in FIG. 5 corresponds to a state in which a voltage is applied to the liquid crystal layer 30 (for example, a state in which a potential difference between the pixel electrode 13 and the common electrode 21 is higher than or equal to a threshold value). As explained above, the response performance of the polymer 31 to the electric field is lower than the response performance of the liquid crystal molecule 32 to the electric field. For example, the alignment direction of the polymer 31 is hardly varied irrespective of the presence or absence of the electric field. In contrast, the alignment direction of the liquid crystal molecule 32 is varied in accordance with the electric field in a state in which a voltage higher than or equal to the threshold value is applied to the liquid crystal layer 30. In other words, the optical axis Ax1 is substantially parallel to the first direction X while the optical axis Ax2 is oblique to the first direction X. If the liquid crystal molecule 32 is positive liquid crystal molecule, the liquid crystal molecules 32 are aligned such that their major axes correspond to the electric field. An electric field between the pixel electrode 11 and the common electrode 21 is formed in the third direction Z. For this reason, the liquid crystal molecules 32 are aligned such that their major axes or the optical axes Ax2 correspond to the third direction Z. In other words, the optical axes Ax1 and optical axes Ax2 intersect each other. A large refractive index difference is therefore generated between the polymer 31 and the liquid crystal molecule 32 in all directions including the first direction X, the second direction Y, and the third direction Z. The light beams L1 to L3 incident on the liquid crystal layer 30 are thereby scattered in the liquid crystal layer 30. The state illustrated in FIG. 5 is called a scattering state.

FIG. 6 is a cross-sectional view showing the display panel PNL in a case where the liquid crystal layer 30 is in a transparent state. A light beam L11 emitted from the light-emitting element LS is made incident on the display panel PNL from the end portions E24 and E34 to propagate through the first substrate SUB1, the liquid crystal layer 30, the second substrate SUB2, and the third substrate SUB3. Since the liquid crystal layer 30 is in the transparent state, the light beam L11 is hardly scattered in the liquid crystal layer 30, and hardly leaks from a lower surface 10B of the transparent substrate 10 or an upper surface 3T of the third substrate SUB3.

An external light beam L12 incident on the display panel PNL is transmitted and hardly scattered in the liquid crystal layer 30. In other words, the external light beam L12 incident on the display panel PNL from the lower surface 10B is transmitted through the upper surface 30T, and the external light beam L12 incident on the display panel PNL from the upper surface 30T is transmitted through the lower surface 10B. For this reason, the user can visually recognize a background on the lower surface 10B side through the display panel PNL when observing the display panel PNL from the upper surface 30T side. Similarly, the user can visually recognize a background on the upper surface 3T side through the display panel PNL when observing the display panel PNL from the lower surface 10B side.

FIG. 7 is a cross-sectional view showing the display panel PNL in a case where the liquid crystal layer 30 is in a scattering state. A light beam L21 emitted from the light-emitting element LS is made incident on the display panel PNL from the end portions E24 and E34 to propagate through the display panel PNL. In the example illustrated in FIG. 7, since the liquid crystal layer 30 overlapping a pixel electrode 11A is in the transparent state, the light beam L21 is hardly scattered in an area of the liquid crystal layer 30 which overlaps the pixel electrode 11A. In contrast, the liquid crystal layer 30 overlapping a pixel electrode 11B is in the scattering state. For this reason, the light beam L21 is scattered in an area which overlaps the pixel electrode 11B in the liquid crystal layer 30. A scattered light beam L211 which is a part of the light beam L21 is transmitted through the upper surface 3T, a scattered light beam L212 which is another part of the light beam L21 is transmitted through the lower surface 10B, and the other scatter light beam propagates through the inside of the display panel PNL.

In the area which overlaps the pixel electrode 11A, an external light beam L22 incident on the display panel PNL is transmitted and hardly scattered in the liquid crystal layer 30, similarly to the external light beam L12 shown in FIG. 6. In the area which overlaps the pixel electrode 11B, an external light beam L23 incident from the lower surface 10B is scattered in the liquid crystal layer 30 and a light beam L231 which is a part of the external light beam L23 is transmitted through the upper surface 3T. In addition, an external light beam L24 incident from the upper surface 3T is scattered in the liquid crystal layer 30 and a light beam L241 which is a part of the external light beam L24 is transmitted through the lower surface 10B. For this reason, the user can visually recognize a color of the light beam L21 in the area overlapping the pixel electrode 11B when observing the display panel PNL from the upper surface 3T side.

In addition, since the light beam L231 of the external light beam L23 is transmitted through the display panel PNL, the user can also visually recognize the background on the lower surface 10B side through the display panel PNL. Similarly, the user can visually recognize a color of the light beam L21 in the area overlapping the pixel electrode 11B when observing the display panel PNL from the lower surface 10B side. In addition, since the light beam L241 of the external light beam L24 is transmitted through the display panel PNL, the user can also visually recognize the background on the upper surface 3T side through the display panel PNL. In the area overlapping the pixel electrode 11A, the color of the light beam L21 can hardly be recognized visually and the user can visually recognize the background through the display panel PNL since the liquid crystal layer 30 is in the transparent state.

Incidentally, the light beam L11 shown in FIG. 6 often leaks to the outside after reaching the end portion E31. Similarly, the light having propagated through the display panel PNL may also leak on the end portions E11 and E21. In the display device DSP having the end portions E11, E21, and E31 exposed, the occurrence of undesired light leakage may cause an impression of the appearance of the display device DSP to be degraded. In addition, the proximity to the end portion E21 is located remote from the light source device LU and tends to have a lower luminance as compared with the proximity to the end portion E24, which is the incidence portion. This difference in luminance between the proximity to the end portion E21 and the proximity to the end portion E24 may cause the display quality to be degraded.

Thus, first to fourth configuration examples will be hereinafter disclosed in the present specification to suppress undesired light leakage.

First Configuration Example

Figure 8A:
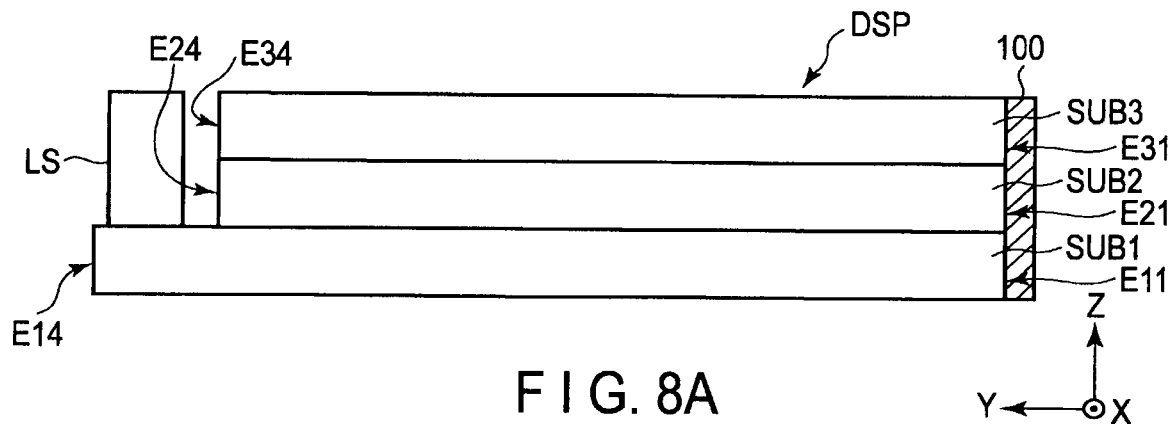
FIG. 8A is a cross-sectional view showing a first configuration example.

FIG. 8A is a cross-sectional view showing a first configuration example. The display device DSP comprises a functional member 100 having an optical function. The functional member 100 is, for example, a light-shielding member, a reflective member, a diffusing member, or the like. The functional member 100 is disposed on the end portion E21. In the example illustrated in FIG. 8A, the functional member 100 is in contact with the end portion E21. The functional member 100 may be a thin film formed directly on the end portion E21 or a thin film bonded to the end portion E21 by an adhesive.

The functional member 100 is also disposed on the end portions E11 and E31. In the example illustrated in FIG. 8A, the functional member 100 is also in contact with the end portions E11 and E31. The functional member 100 may be disposed on the end portions E11, E21, and E31 separately or integrally. In the example illustrated in FIG. 8A, the end portions E11, E21, and E31 are located on the same plane parallel to X-Z plane defined by the first direction X and the third direction Z. In other words, the end portion E21 is located just above the end portion E11, and the end portion E31 is located just above the end portion E21. In this example, the single functional member 100 is disposed on the end portions E11, E21, and E31.

Figure 8B:
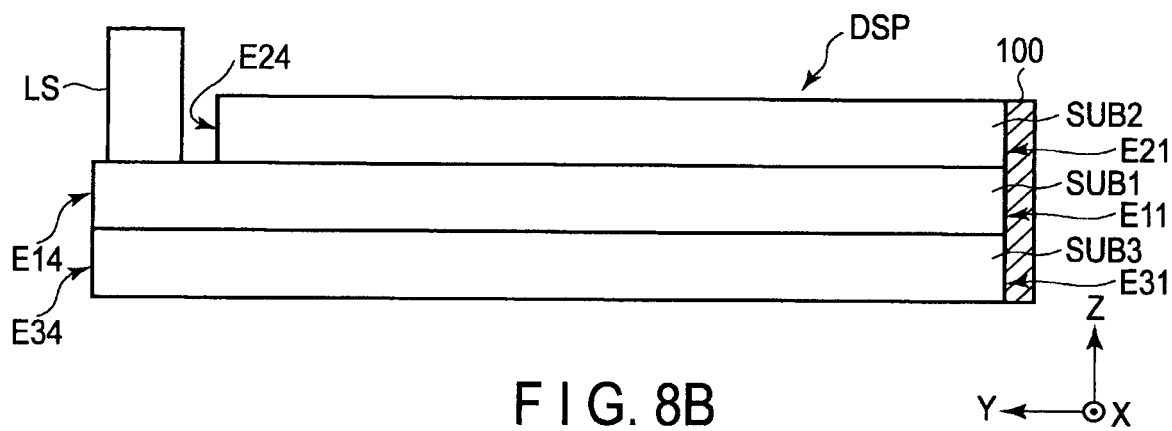
FIG. 8B is a cross-sectional view showing a first modified example of the first configuration example.

FIG. 8B is a cross-sectional view showing a first modified example of the first configuration example. The third substrate SUB3 is disposed below the first substrate SUB1 and bonded to the first substrate SUB1. In the first modified example, too, the functional member 100 is disposed on the end portions E11, E21, and E31.

Figure 8C:
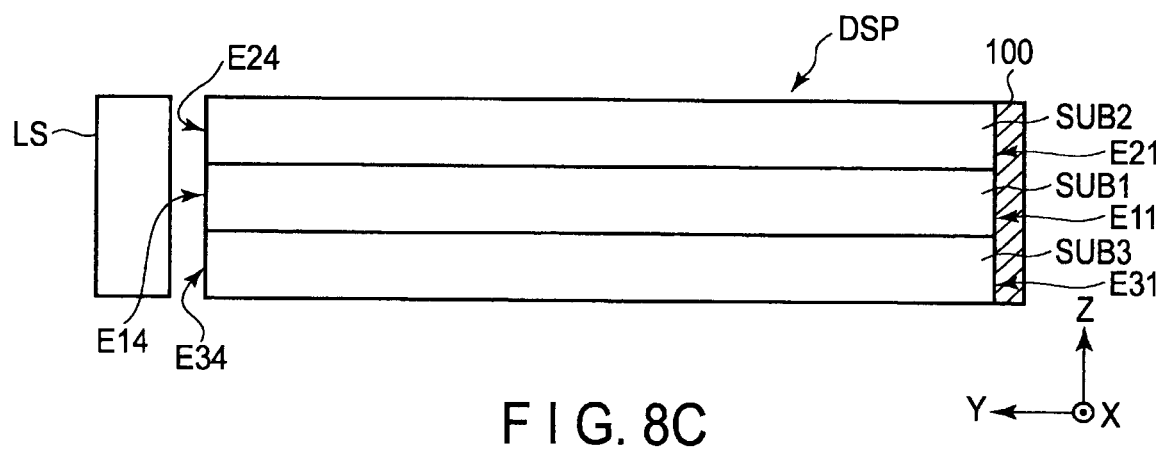
FIG. 8C is a cross-sectional view showing a second modified example of the first configuration example.

FIG. 8C is a cross-sectional view showing a second modified example of the first configuration example. The second modified example is different from the first modified example with respect to a feature that the end portions E34, E14, and E24 are arranged in the third direction Z in this order and the end portions are located on the same plane substantially parallel to X-Z plane. The end portions E34, E14, and E24 are opposed to the light-emitting element LS in the second direction Y.

Figure 9:
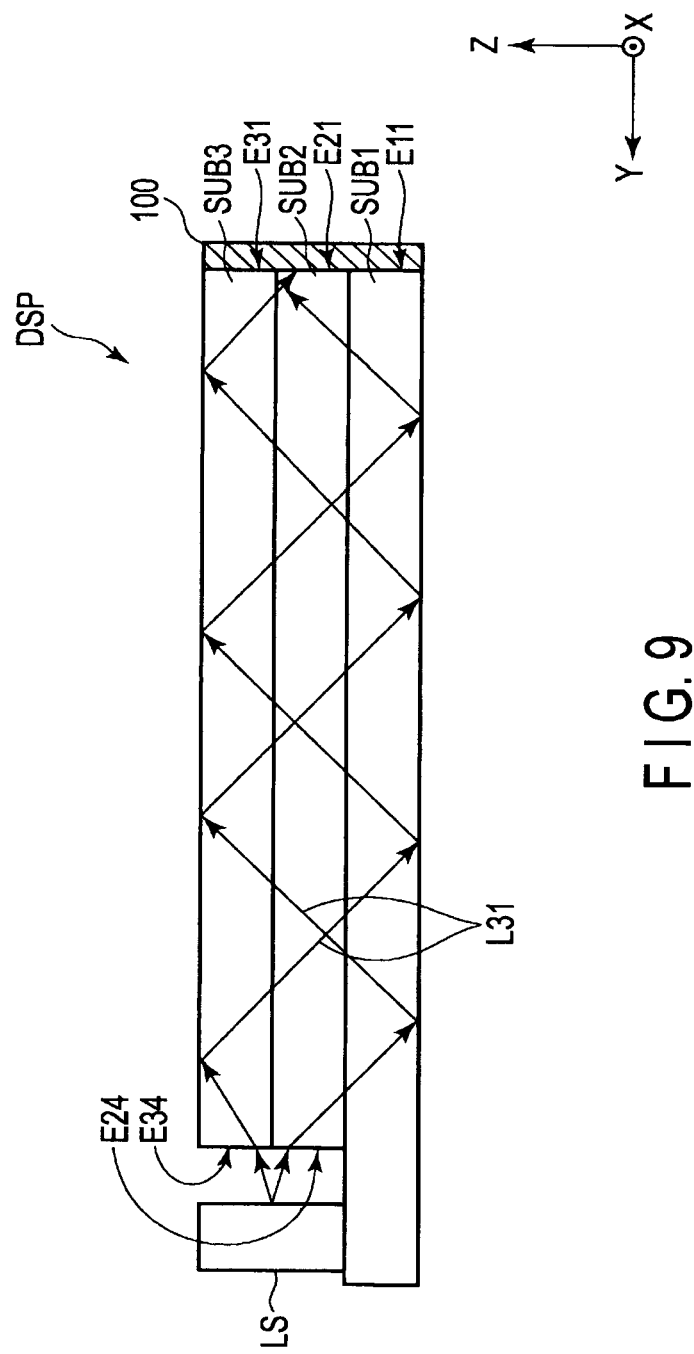
FIG. 9 is a cross-sectional view for explanation of an action in a case where a functional member 100 is a light-shielding member.

FIG. 9 is a cross-sectional view for explanation of an action in a case where a functional member 100 is a light-shielding member. The light-shielding member is formed of, for example, a resin material colored in block or a light-shielding metal material. A light beam L31 emitted from the light-emitting element LS is made incident from the end portions E24 and E34 to propagate through the first substrate SUB1, the second substrate SUB2, and the third substrate SUB3. The light beam L31 having reached the end portion E21 is blocked by the functional member 100. The light beam L31 having reached the end portions E11 and E31 is also blocked by the functional member 100. For this reason, undesired light leakage can be suppressed. Degradation in impression of the appearance can be therefore suppressed in the display device DSP.

FIG. 10 is a cross-sectional view for explanation of an action in a case where the functional member 100 is a reflective member. The reflective member is formed of, for example, a metal material having a high reflectance such as aluminum, silver, or titanium. A light beam L31 emitted from the light-emitting element LS is made incident from the end portions E24 and E34 to propagate through the first substrate SUB1, the second substrate SUB2, and the third substrate SUB3. The light beam L31 having reached the end portion E21 is reflected to the light-emitting element LS side by the functional member 100. The light beam L31 having reached the end portions E11 and E31 is also reflected by the functional member 100. For this reason, undesired light leakage can be suppressed and the light having reached the end portion E21 side opposite to the light-emitting element LS can be reused. Degradation in the luminance on the end portion E21 side can be therefore suppressed. Thus, the brightness difference between the end portion E24 side close to the light-emitting element LS and the end portion E21 side remote from the light-emitting element LS can be reduced and the degradation in display quality can be suppressed.

In the example illustrated in FIG. 10, the end portion E24 corresponds to the first portion, the end portion E21 corresponds to the second end portion, the end portion E11 corresponds to the third end portion, the end portion E34 corresponds to the fourth end portion, and the end portion E31 corresponds to the fifth end portion.

Second Configuration Example

FIG. 11 is a cross-sectional view showing a second configuration example. The second configuration example is different from the first configuration example with respect to a feature that the functional member 100 is also disposed on the lower surface 10B and the upper surface 3T of the non-display area NDA. The single functional member 100 is disposed on the end portions E11, E21, and E31, a portion exceeding the end portion E11 is bent and disposed on the lower surface 10B, and a portion exceeding the end portion E31 is bent and disposed on the upper surface 3T. The functional member 100 is in contact with each of the end portions E11, E21, and E31, the lower surface 10B, and the upper surface 3T. The functional member 100 may be a light-shielding member or a reflective member as explained above.

In the second configuration example, too, the same advantages as those of the first configuration example can be obtained. In addition, undesired light leakage from the lower surface 10B and the upper surface 3T in the non-display area NDA can be suppressed.

Third Configuration Example

FIG. 12A is a cross-sectional view showing a third configuration example. The third configuration example is different from the first configuration example with respect to a feature of comprising a plurality of functional members 100A and 100B. In the example illustrated in FIG. 12A, the end portion E21 is located just above the end portion E11, while the end portions E31 is not located just above the end portion E21 but displaced from the end portion E21 in the second direction Y. The functional member 100A is disposed on the end portions E11 and E21, and the functional member 100B is disposed on the end portion E31. The functional members 100A and 100B may be light-shielding members or reflective members as explained above. In addition, the functional members may be separated in accordance with the number of the end portions arranged in the third direction Z or the functional members may be disposed on the end portions E11, E21, and E31, respectively.

In the third configuration example, too, the same advantages as those of the first configuration example can be obtained. In addition, if at least one of the end portions E11, E21, and E31 is displaced, the functional members 100A and 100B are hardly peeled off from the end portions E11, E21, and E31. For this reason, if the functional members 100A and 100B are reflective members, degradation in display quality which results from non-uniformity in reflected light can be suppressed.

FIG. 12B is a cross-sectional view showing a modified example. The single functional member 100 is disposed on the end portions E11, E21, and E31, bent between the end portions E21 and E31, and disposed on an upper surface 2T of the second substrate SUB2. The functional member 100 is in contact with the upper surface 2T at a position between the end portions E21 and E31. The functional member 100 may be a light-shielding member or a reflective member as explained above.

Fourth Configuration Example

FIG. 13 is a cross-sectional view showing a fourth configuration example. The fourth configuration example is different from the first configuration example with respect to a feature of comprising a first functional member 110 and a second functional member 120 having a function different from the first functional member 110. In the example illustrated in FIG. 13, the second functional member 120 is in contact with the end portion E21, and the first functional member 110 is in contact with the second functional member 120. Not only the second functional member 120, but also the other functional members may be disposed between the first functional member 110 and the end portion E21. The first functional member 110 may be a thin film formed directly on the end portion E21 and the second functional member 120 may be a thin film formed directly on the first functional member 110, or the first functional member 110 may be a thin film and the second functional member 120 may be an adhesive to bond the first functional member 110 to the end portion E21. For example, the first functional member 110 is a reflective member, and the second functional member 120 is a diffusing member.

The stacked layer body of the first functional member 110 and the second functional member 120 is also disposed on the end portions E11 and E31. The second functional member 120 is in contact with each of the end portions E11 and E31. In an example in which the end portion E21 is located just above the end portion E11, and the end portion E31 is located just above the end portion E21, the single first functional member 110 and the single second functional member 120 overlap in the second direction Y, and the first functional member 110 and the second functional member 120 are disposed on the end portions E11, E21, and E31.

The first functional member 110 and the second functional member 120 may extend to the lower surface 10B and the upper surface 3T, similarly to the second configuration example. In addition, the first functional member 110 and the second functional member 120 may be separated to be disposed on the respective end portions, similarly to the third configuration example.

FIG. 14 is an illustration for explanation of diffusibility of a second functional member 120 which is a diffusing member. The second functional member 120 diffuses the light incident in the second direction Y into the X-Z plane. The second functional member 120 explained here is an anisotropically diffusing member having diffusibility Dx in the first direction X larger than diffusibility Dz in the third direction Z. As explained above, the longitudinal direction of the end portion E21 is parallel to the first direction X, and the thickness direction of the end portion E21 is parallel to the third direction Z. In other words, the light passing through the second functional member 120 is diffused more largely in the longitudinal direction of the end portion E21 than in the thickness direction of the end portion E21.

FIG. 15 is a cross-sectional view for explanation of an action of the second functional member 120 shown in FIG. 14. Since the second functional member 120 has smaller diffusibility Dz, the diffusion in the third direction Z, of the light reflected by the first functional member 110 can be suppressed. For this reason, leakage of the reflected light from the lower surface 10B and the upper surface 3T can be suppressed.

FIG. 16 is a plan view for explanation of an action of the second functional member 120 shown in FIG. 14. Since the second functional member 120 has larger diffusibility Dx, the light reflected by the first functional member 110 is diffused in the first direction X and the luminance of the reflected light can be uniformed at positions close to the end portion E21 and the like. In addition, even if the end portion E21 and the like have cracks or fine unevenness, the luminance of the reflected light can be uniformed by the diffusing effect of the second functional member 120.

Arrangement Example

An arrangement example of various functional members will be explained below. Each of arrangement examples explained below can be employed in any one of the first to fourth configuration examples explained above.

Figure 17:
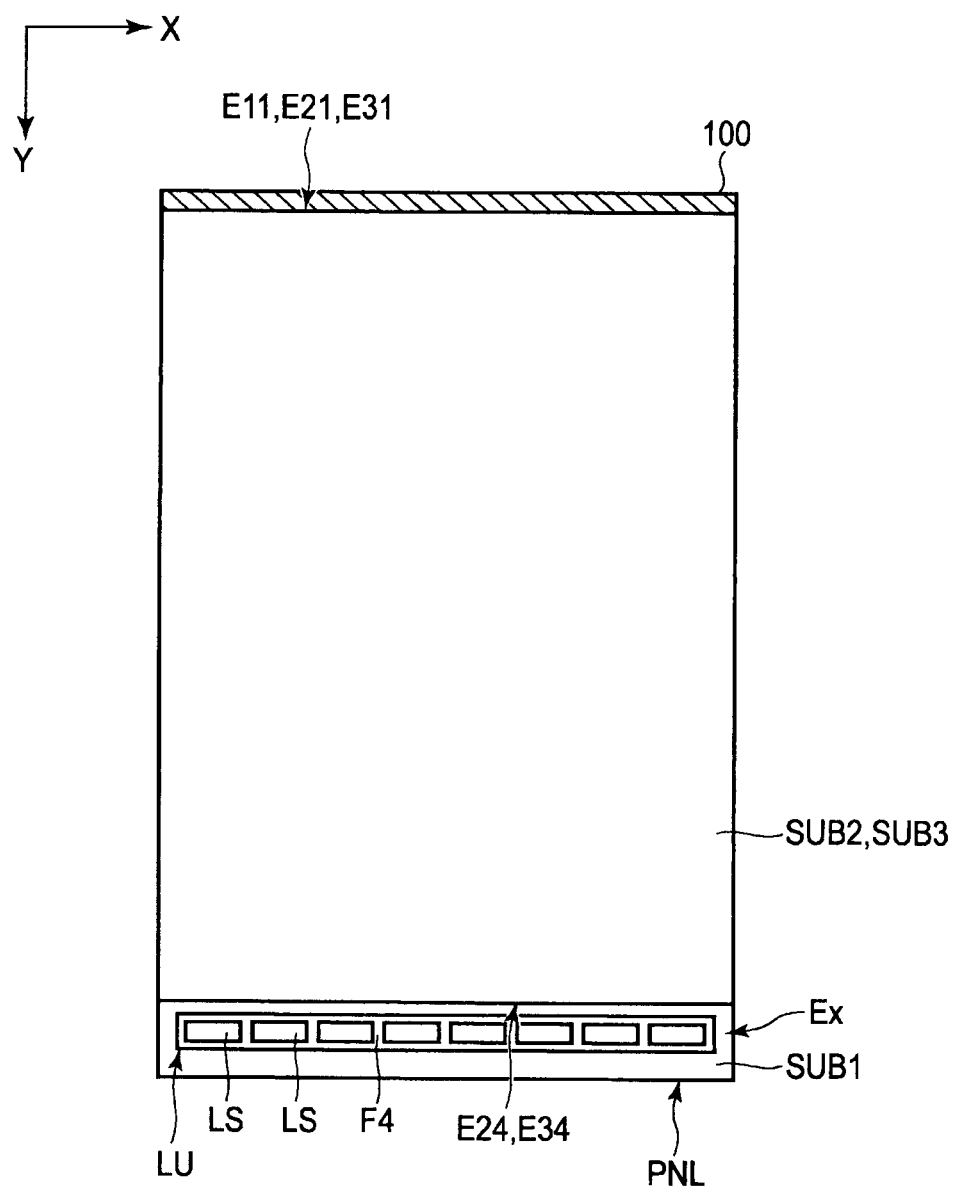
FIG. 17 is a plan view showing a first arrangement example.

FIG. 17 is a plan view showing a first arrangement example. The single functional member 100 is disposed on the only end portions E11, E21, and E31 on the side opposite to the end portions E24 and E34, which are the incidence portions. The functional member 100 is a light-shielding member or a reflective member. If the functional member 100 is a light-shielding member, the light leakage at the end portion E21 can be suppressed. If the functional member 100 is a reflective member, the light leakage at the end portion E21 can be suppressed and the degradation in luminance on the end portion E21 side can also be suppressed.

FIG. 18 is a plan view showing a second arrangement example. The second arrangement example is different from the fifth arrangement example with respect to a feature of comprising functional members 101 to 103. The functional member 101 is disposed on the end portions E11, E21, and E31 extending in the first direction X. The functional member 102 is disposed on the end portions E12, E22, and E32 extending in the second direction Y. The functional member 103 is disposed on end portions E13, E23, and E33 extending in the second direction Y. Each of the functional members 101 to 103 is formed independently. The functional members 101 to 103 are light-shielding members or reflective members.

All of the functional members 101 to 103 may be light-shielding members or reflective members. In addition, a combination of the functional member 101 which is a reflective member and the functional members 102 and 103 which are light-shielding members, a combination of the functional member 101 which is a light-shielding member and the functional members 102 and 103 which are reflective members, and the like can be applied.

In the second arrangement example, too, the same advantages as those of the first arrangement example can be obtained. In addition, if the functional members 102 and 103 are light-shielding members, the functional members 102 and 103 can also suppress the light leakage at the end portions E22 and E23. If the functional members 102 and 103 are reflective members, the functional members 102 and 103 can suppress the light leakage at the end portions E22 and E23 and the degradation in luminance on the end portion E22 side and the end portion E23 side.

FIG. 19 is a plan view showing a third arrangement example. The third arrangement example is different from the first arrangement example with respect to a feature that the single functional member 100 is disposed along three sides except the incidence portions. The functional member 100 is disposed on the end portions E11, E21, and E31, disposed on the end portions E12, E22, and E32, and disposed on the end portions E13, E23, and E33. The functional member 100 is a light-shielding member or a reflective member.

In the third arrangement example, too, the same advantages as those of the second arrangement example can be obtained.

FIG. 20 is a plan view showing a fourth arrangement example. The fourth arrangement example is different from the first arrangement example with respect to a feature of comprising a first functional member 111 and a second functional member 121 different in function. The second functional member 121 is in contact with the end portions E11, E21, and E31. The first functional member 111 overlaps the second functional member 121. For example, the first functional member 111 is a reflective member, and the second functional member 121 is a diffusing member.

In the fourth arrangement example, the light leakage at the end portion E21 can be suppressed, the degradation in luminance on the end portion E21 side can be suppressed, and the luminance can be uniformed.

Figure 21:
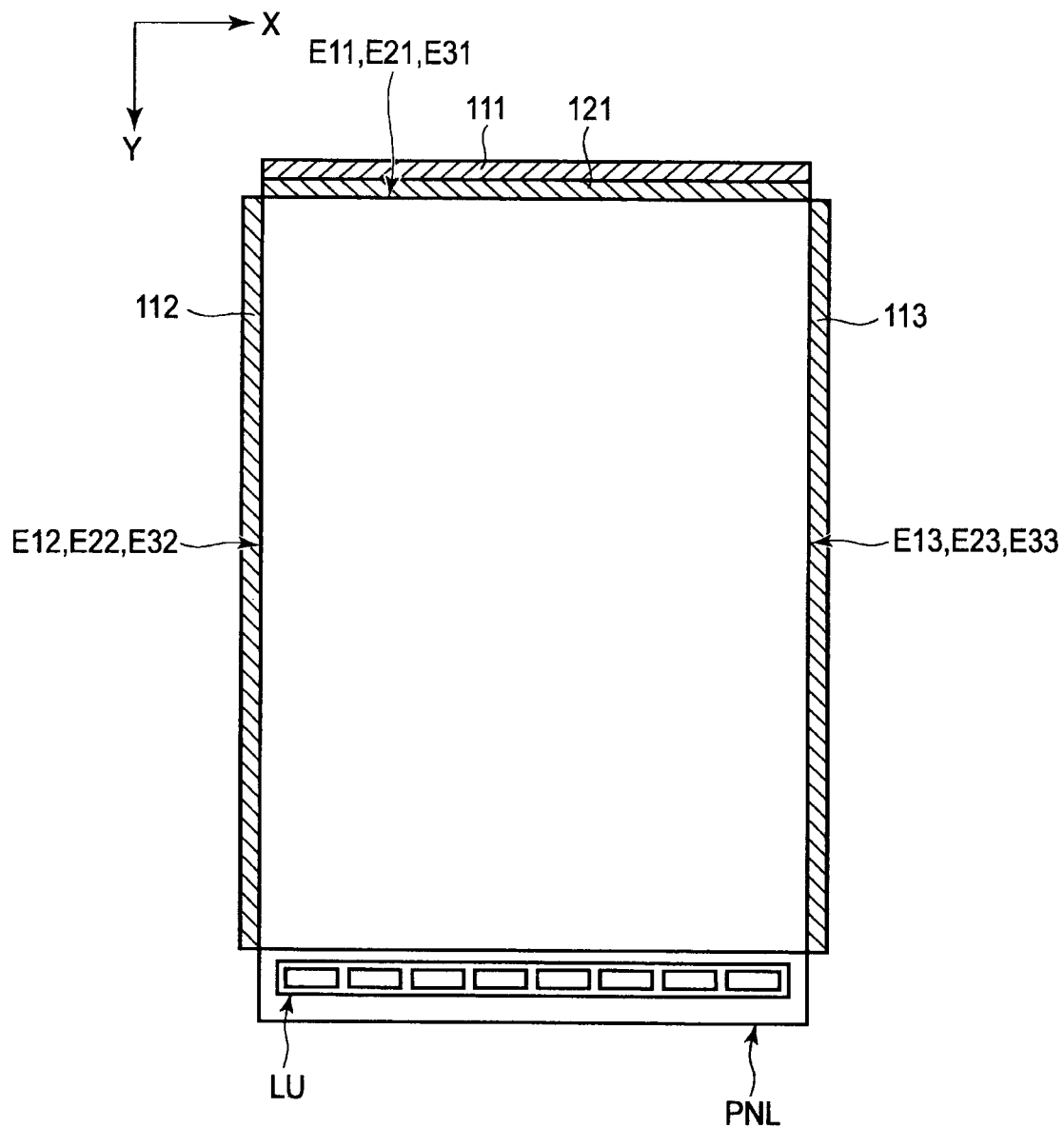
FIG. 21 is a plan view showing a fifth arrangement example.

FIG. 21 is a plan view showing a fifth arrangement example. The fifth arrangement example is different from the fourth arrangement example with respect to a feature of comprising first functional members 112 and 113 besides the first functional member 111. The first functional member 112 is in contact with the end portions E12, E22, and E32. The first functional member 113 is in contact with the end portions E13, E23, and E33. For example, the first functional members 111 to 113 are reflective members, and the second functional member 121 is a diffusing member.

In the fifth arrangement example, too, the same advantages as those of the fourth arrangement example can be obtained. In addition, degradation in the luminance on the end portion E22 side and the end portion E23 side can be suppressed.

Figure 22:
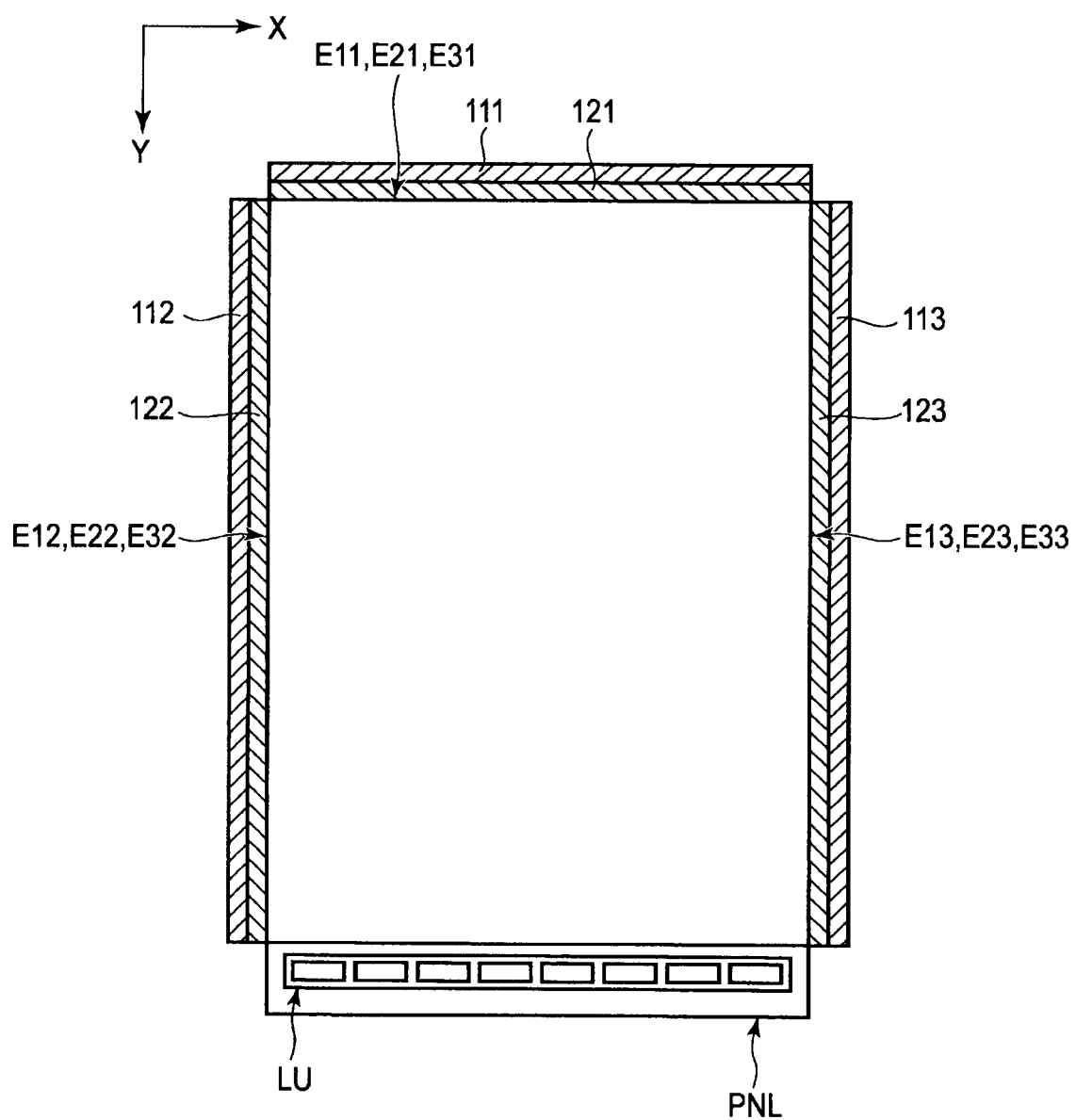
FIG. 22 is a plan view showing a sixth arrangement example.

FIG. 22 is a plan view showing a sixth arrangement example. The sixth arrangement example is different from the fifth arrangement example with respect to a feature of further comprising second functional members 122 and 123. The second functional member 122 is in contact with the end portions E12, E22, and E32. The first functional member 112 overlaps the second functional member 122. The second functional member 123 is in contact with the end portions E13, E23, and E33. The first functional member 113 overlaps the second functional member 123. For example, the first functional members 111 to 113 are reflective members, and the second functional members 121 to 123 are diffusing members.

In the fifth arrangement example, too, the same advantages as those of the fourth arrangement example can be obtained. In addition, degradation in the luminance on the end portion E22 side and the end portion E23 side can be suppressed, and the luminance can be uniformed.

Figure 23:
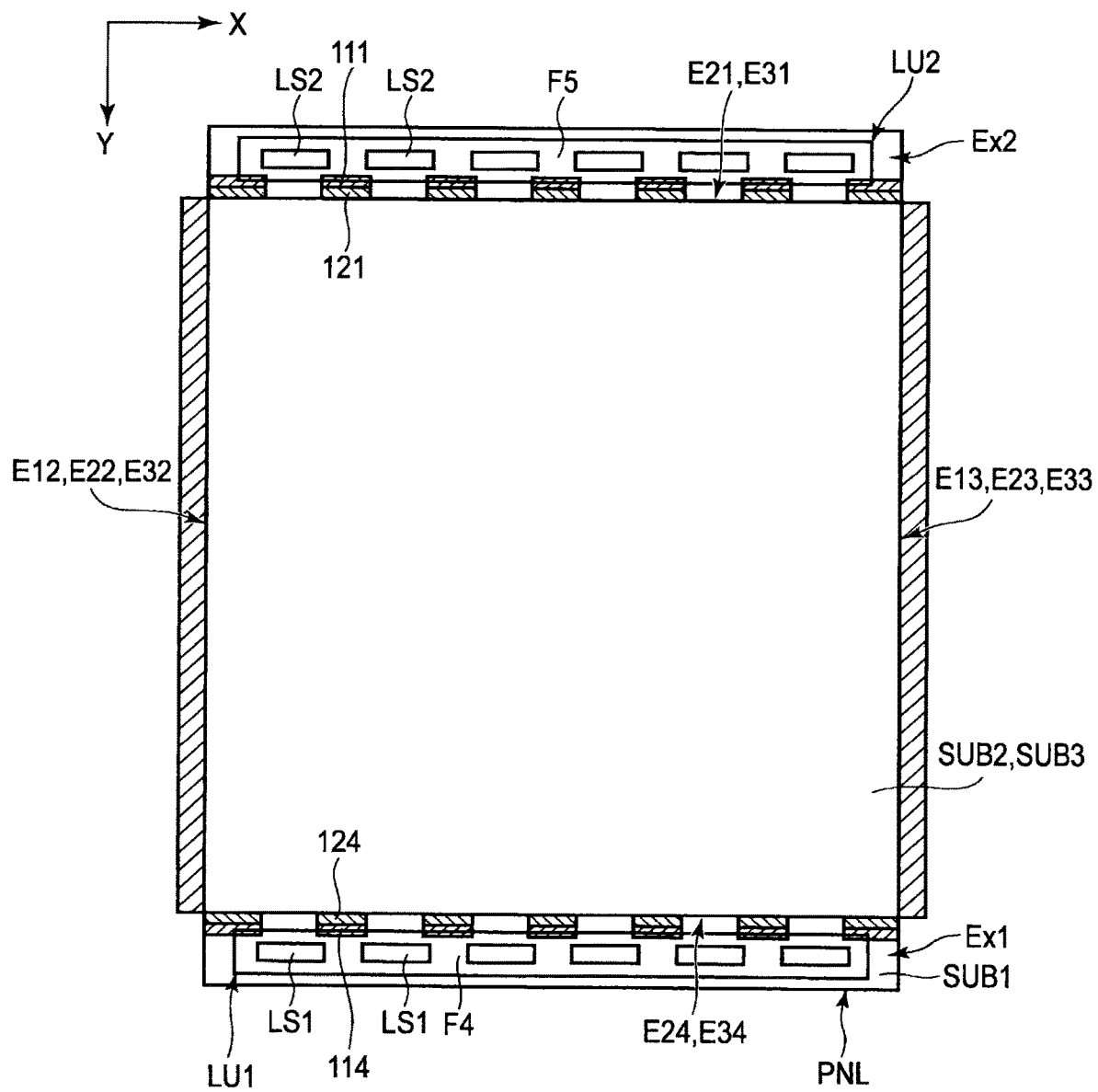
FIG. 23 is a plan view showing a seventh arrangement example.

FIG. 23 is a plan view showing a seventh arrangement example. The seventh arrangement example is different from the above-explained arrangement examples with respect to a feature of comprising light source devices LU1 and LU2. The first substrate SUB1 comprises extension portions Ex1 and Ex2 further extending in the second direction Y than the second substrate SUB2 and the third substrate SUB3. The light source device LU1 is located above the extension portion Ex1, and the light source device LU2 is located above the extension portion Ex2.

The light source device LU1 is disposed along the end portions E24 and E34. The light source device LU1 comprises light-emitting elements LS1 arranged at intervals in the first direction X, and a wiring substrate F4 to which the light-emitting elements LS1 are connected. For example, two light-emitting elements LS1 arranged in the first direction X correspond to a first light-emitting element and a second light-emitting element, respectively. A second functional member 124 located between two light-emitting elements LS1 is disposed on the end portions E24 and E34, and the first functional member 114 overlaps the second functional member 124.

The light source device LU2 is disposed along the end portions E21 and E31. The light source device LU2 comprises light-emitting elements LS2 arranged at intervals in the first direction X, and a wiring substrate F5 to which the light-emitting elements LS2 are connected. A second functional member 121 located between two light-emitting elements LS2 is disposed on the end portions E21 and E31, and the first functional member 111 overlaps the second functional member 121. The first functional members 111 and 114 are reflective members, and the second functional members 121 and 124 are diffusing members.

The light emitted from the light-emitting elements LS1 is made incident from the end portions E24 and E34 to propagate toward the end portions E21 and E31. The light having reached the end portions E21 and E31 is diffused by the second functional member 121 and reflected by the first functional member 111. Similarly, the light emitted from the light-emitting elements LS2 is made incident from the end portions E21 and E31 to propagate toward the end portions E24 and E34. The light having reached the end portions E24 and E34 is diffused by the second functional member 124 and reflected by the first functional member 114.

According to the seventh arrangement example, degradation in the luminance on the end portion E21 side and the end portion E24 side can be suppressed, and the luminance can be uniformed.

Figure 24:
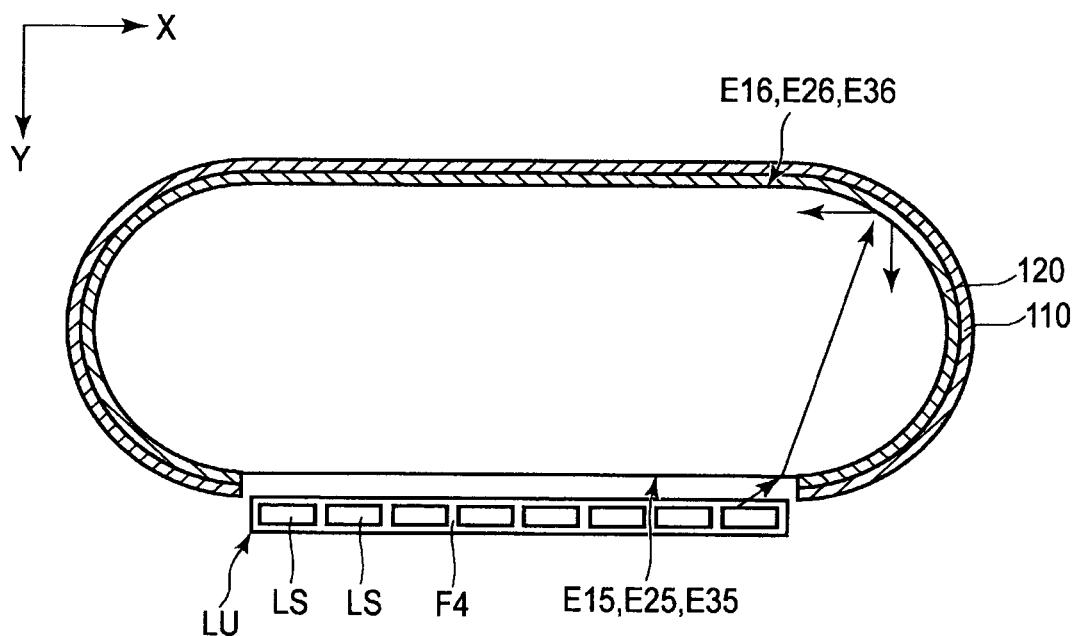
FIG. 24 is a plan view showing an eighth arrangement example.

FIG. 24 is a plan view showing an eighth arrangement example. The eighth arrangement example is different from the above-explained arrangement examples with respect to a feature that the first substrate SUB1, the second substrate SUB2, and the third substrate SUB3 have different shapes. The first substrate SUB1 includes an end portion E15 extending in the first direction X, and an end portion E16 having at least a part formed in a curved shape in planar view. In the example illustrated in FIG. 24, the first substrate SUB1 is formed in an ellipsoidal shape (or a track shape) in planar view. The first substrate SUB1, the second substrate SUB2 and the third substrate SUB3 are formed in substantially the same shape. The second substrate SUB2 includes an end portion E25 located on the end portion E15 side and an end portion E26 located on the end portion E16 side. The third substrate SUB3 includes an end portion E35 located on the end portion E15 side and an end portion E36 located on the end portion E16 side.

The light source device LU is disposed along the end portions E15, E25, and E35. The second functional member 120 is disposed on the end portions E16, E26, and E36. The first functional member 110 overlaps the second functional member 120.

According to the eighth arrangement example, degradation in the luminance on the end portion E26 side can be suppressed, and the luminance can be uniformed.

As explained above, a display device capable of suppressing the undesired light leakage can be provided by the present embodiments.

The present invention is not limited to the embodiments described above but the constituent elements of the invention can be modified in various manners without departing from the spirit and scope of the invention. Various aspects of the invention can also be extracted from any appropriate combination of a plurality of constituent elements disclosed in the embodiments. For example, some structural elements may be deleted from the entire structural elements in the embodiments. Furthermore, structural elements described in different embodiments may be combined suitably.

In the above-explained embodiments, the configuration examples employing the polymer dispersed liquid crystal for the display panel PNL have been explained, but the configuration examples may be employed in an illumination device combined with a transmissive display panel or a reflective display panel. According to the illumination device, the scattering state and the transparent state can be changed on not only the entire surface of the display area DA, but also a partial surface of the display area DA. In addition, loss resulting from undesired scattering and undesired absorption can be reduced and the efficiency of use of the light can be improved, by employing the above-explained configuration examples.

Examples of the display device which can be obtained from the configurations described in the present specification will be hereinafter explained.

(1)

A display device, comprising:

a first substrate;

a second substrate including a first end portion and a second end portion located at a position different from the first end portion;

a polymer dispersed liquid crystal layer disposed between the first substrate and the second substrate;

a light source device located above the first substrate and disposed along the first end portion; and a light-shielding member disposed on at least a part of the second end portion.

(2)

The display device according to (1), wherein the first substrate includes a third end portion located on the second end portion side, and the light-shielding member is disposed on at least a part of the third end portion.

(3)

The display device according to (1) or (2), further comprising:

a third substrate, wherein the second substrate is located between the first substrate and the third substrate, the third substrate includes a fourth end portion located on the first end portion side and a fifth end portion located on the second end portion side, the light source device is disposed along the fourth end portion, and the light-shielding member is disposed on at least a part of the fifth end portion.

(4)

A display device, comprising:

a first substrate;

a second substrate including a first end portion and a second end portion located at a position different from the first end portion;

a polymer dispersed liquid crystal layer disposed between the first substrate and the second substrate;

a light source device located above the first substrate and disposed along the first end portion; and a reflective member disposed on at least a part of the second end portion.

(5)

The display device according to (4), further comprising:

a diffusing member located between the second end portion and the reflective member.

(6)

The display device according to (5), wherein the diffusing member is an anisotropically diffusing member.

(7)

The display device according to any one of (4) to (6), wherein the first substrate includes a third end portion located on the second end portion side, and the reflective member is disposed on at least a part of the third end portion.

(8)

The display device according to any one of (4) to (7), further comprising:

a third substrate, wherein the second substrate is located between the first substrate and the third substrate, the third substrate includes a fourth end portion located on the first end portion side and a fifth end portion located on the second end portion side, the light source device is disposed along the fourth end portion, and the reflective member is disposed on at least a part of the fifth end portion.

(9)

The display device according to any one of (4) to (8), wherein the second end portion includes a first portion opposed to the first end portion, and a second portion and a third portion which are opposed to each other, the second portion and the third portion are adjacent to the first end portion and the first portion, respectively, the reflective member and the diffusing member are disposed on the first portion, and the diffusing member is in contact with the first portion.

(10)

The display device according to (9), wherein the reflective member and the diffusing member are disposed on the second portion and the third portion, and the diffusing member is in contact with each of the second portion and the third portion.

(11)

The display device according to (9), wherein the reflective member is disposed on the second portion and the third portion, and the reflective member is in contact with each of the second portion and the third portion.

(12)

The display device according to (4), wherein the light source device comprises:

a first light-emitting element and a second light-emitting element; and a diffusing member, the diffusing member is located between the first light-emitting element and the second light-emitting element, at the first end portion.

(13)

The display device according to any one of (1) to (12), wherein the polymer dispersed liquid crystal layer includes a polymer formed of a polymeric material and liquid crystal molecules dispersed in the polymer.

(14)

The display device according to any one of (1) to (13), wherein the first substrate comprises a pixel electrode, the second substrate comprises a common electrode, and a transparent state and a scattering state of the polymer dispersed liquid crystal layer are controlled in accordance with voltages applied to the pixel electrode and the common electrode.

(15)

The display device according to (8), wherein light from the light source device is made incident on the first end portion of the second substrate, and the fourth end portion of the third substrate.

What is claimed is:

1. A display device, comprising:

a display panel including:

a first substrate;

a second substrate opposed to the first substrate;

a polymer dispersed liquid crystal material disposed between the first substrate and the second substrate; and a third substrate opposed to the second substrate;

a light source device disposed along a first end portion of the display panel; and a reflective member disposed on a second end portion of the display panel opposed to the first end portion, wherein the display panel includes a third end portion between the first end portion and the second end portion in a plan view, and a fourth end portion opposed to the third end portion, the reflective member is disposed on the second end portion, the third end portion, and the fourth end portion, and on the second end portion side, an edge of the third substrate is located at a different position from an edge of the first substrate and an edge of the second substrate.

2. The display device according to claim 1, wherein light from the light source device is made incident on the first end portion.

3. The display device according to claim 1, wherein the polymer dispersed liquid crystal material includes a polymer formed of a polymeric material and liquid crystal molecules dispersed in the polymer.

4. The display device according to claim 1, wherein
the first substrate comprises a pixel electrode,
the second substrate comprises a common electrode, and
a transparent state and a scattering state of the polymer dispersed liquid crystal material are controlled in accordance with voltages applied to the pixel electrode and the common electrode.

5. The display device according to claim 1, further comprising a diffusing member between the second end portion and the reflective member.

6. The display device according to claim 5, wherein the diffusing member is an anisotropically diffusing member.

7. The display device according to claim 5, wherein the diffusing member is between the third end portion and the reflective member, and between the fourth end portion and the reflective member.

8. The display device according to claim 1, wherein the display panel does not include a polarizer.

* * * * *